US009882891B2

United States Patent
Cuff et al.

(10) Patent No.: US 9,882,891 B2
(45) Date of Patent: Jan. 30, 2018

(54) IDENTITY VERIFICATION

(71) Applicant: TOKEN ONE PTY., LTD., Millers Point, New South Wales (AU)

(72) Inventors: Philip Anthony Frederick Cuff, Millers Point (AU); Kamil Kreiser, Kensington (AU); Marek Kreiser, Eltham North (AU)

(73) Assignee: Token One Pty. Ltd. (AU)

( * ) Notice: Subject to any disclaimer, the term of this patent is extended or adjusted under 35 U.S.C. 154(b) by 0 days.

(21) Appl. No.: 15/316,004

(22) PCT Filed: Jun. 4, 2015

(86) PCT No.: PCT/AU2015/050307
§ 371 (c)(1),
(2) Date: Dec. 2, 2016

(87) PCT Pub. No.: WO2015/184507
PCT Pub. Date: Dec. 10, 2015

(65) Prior Publication Data
US 2017/0118198 A1    Apr. 27, 2017

(30) Foreign Application Priority Data
Jun. 4, 2014    (AU) .................................. 2014902141

(51) Int. Cl.
*H04L 29/06*    (2006.01)
(52) U.S. Cl.
CPC .......... *H04L 63/0823* (2013.01); *H04L 63/12* (2013.01)
(58) Field of Classification Search
CPC ......................... H04L 63/0823; H04L 63/12
See application file for complete search history.

(56) References Cited

U.S. PATENT DOCUMENTS

| 6,058,484 | A  | * | 5/2000 | Chapman | ................ | G06F 21/33 |
|---|---|---|---|---|---|---|
| | | | | | | 709/218 |
| 7,996,861 | B1 | | 8/2011 | Delpuch | | |
| 8,224,753 | B2 | | 7/2012 | Atef et al. | | |
| 8,555,078 | B2 | | 10/2013 | Pravetz et al. | | |

(Continued)

FOREIGN PATENT DOCUMENTS

| GB | 2488310 | A | 8/2012 | | |
|---|---|---|---|---|---|
| GB | 2488310 | A8 | * 1/2016 | ............ | G06F 21/31 |
| WO | 2014/176645 | A1 | 6/2014 | | |

OTHER PUBLICATIONS

International Search Report for Application No. PCT/AU2015/050307 dated Aug. 25, 2015.

*Primary Examiner* — Ellen Tran
(74) *Attorney, Agent, or Firm* — Tarolli, Sundheim, Covell & Tummino LLP

(57) ABSTRACT

A method, server processing system and computer readable medium for identity verification is disclosed. In one aspect, the server processing system is configured to: receive digitally signed data including rating data issued by a second server processing system in order for an entity to register for a service associated with the server processing system, the rating data is indicative of an identity verification rating for the entity; verify that the digitally signed data has been issued by the second server processing system; and use the identity verification rating to register the entity in the event that the rating data is successfully verified as being issued by the second server processing system.

21 Claims, 12 Drawing Sheets

(56) References Cited

U.S. PATENT DOCUMENTS

| | | |
|---|---|---|
| 8,745,718 B1 | 6/2014 | Dufel et al. |
| 2001/0037468 A1 | 11/2001 | Gaddis |
| 2002/0026581 A1* | 2/2002 | Matsuyama ............ G06F 21/10 |
| | | 713/168 |
| 2007/0143831 A1 | 6/2007 | Pearson et al. |
| 2008/0141362 A1 | 6/2008 | Torres et al. |
| 2009/0328203 A1 | 12/2009 | Haas |
| 2010/0132019 A1 | 5/2010 | Hardt |
| 2013/0340028 A1* | 12/2013 | Rajagopal ............... H04L 63/08 |
| | | 726/1 |
| 2014/0059657 A1 | 2/2014 | Barrett |
| 2014/0096177 A1 | 4/2014 | Smith et al. |

* cited by examiner

IDENTITY VERIFICATION

RELATED APPLICATIONS

The present invention is a U.S. National Stage under 35 USC 371 patent application, claiming priority to PCT Application Serial No. PCT/AU2015/050307, filed on 4 Jun. 2015; which claims priority from Australian Provisional Patent Application No. AU 2014902141, filed on 4 Jun. 2014, the entirety of both of which are incorporated herein by reference.

CROSS-REFERENCE TO RELATED APPLICATIONS

The present application claims priority from Australian Provisional Patent Application 2014902141 filed on 4 Jun. 2014, the content of which is incorporated by reference.

FIELD OF INVENTION

The present invention relates to a system, method, server processing system and computer readable medium for identity verification.

BACKGROUND

Authentication systems such as OAuth and Facebook Connect allow a service provider to verify the identity of a user by sharing a secure session token of a connection between the authentication system and the user.

This type of authentication system does not typically allow a service provider to establish their own identity credential relationship with the user without conducting their own identity verification process.

These types of authentication systems lack robustness. In the event that the authentication system is in a state of compromise, the service provider is unable to authenticate the user. Additionally, service providers may be affected by the operational rules and business practices of the authentication system which may not be in the interests of service providers.

Whilst it is possible for a service provider to request users to provide sufficient identification information in conducting an identity verification process prior to enabling a user to access a service, this option is typically not ideal for the user or the third party. In particular, the user is required to supply identification information which may have been provided to another party previously, thus duplicating work. Furthermore, the service provider may not have the necessary services to be able to perform the identity verification process for the service being provided.

Therefore, there is a need to overcome or at least alleviate one or more of the above-mentioned disadvantages.

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

SUMMARY OF INVENTION

In a first aspect there is provided a method performed by a server processing system including steps of:

receiving digitally signed data including rating data issued by a second server processing system in order for an entity to register for a service associated with the server processing system, the rating data is indicative of an identity verification rating for the entity;

verifying that the digitally signed data has been issued by the second server processing system; and using the identity verification rating to register the entity in the event that the rating data is successfully verified as being issued by the second server processing system.

In certain embodiments, the method includes receiving the digitally signed data from a relying party processing system offering the service upon successful identity verification.

In certain embodiments, the method includes the server processing system receiving, from the relying party, a request to authenticate the user to access the service after registration, wherein the server processing system transfers a response to the relying party indicative of the authentication result.

In certain embodiments, the rating data is indicative of an authentication technology rating, wherein the method includes the server processing system using an authentication technology to authenticate the user according to the authentication technology rating.

In certain embodiments, the method includes:

receiving, from a relying party processing system associated with the relying party, the request to authenticate the user;

transferring, to the entity or an entity device associated with the entity, an index corresponding to a selected key from a keymap, wherein the keymap is stored in memory of the entity device and in server accessible memory;

receiving data indicative of a code, wherein the user determines the code based on the selected key presented by the entity device and a personal identifier;

determining, a hash value of the personal identifier using the code and the selected key stored in the server accessible memory;

comparing the determined hash value against a stored hash value associated with a user account stored in the server accessible memory; and transferring the response to the relying party processing system, wherein the response is indicative of whether the user is authenticated for accessing the service based on the comparison.

In certain embodiments, the method includes the server processing system comparing the identity verification rating against a threshold identity verification rating, wherein in the event that the identity verification rating satisfies the threshold identity verification rating, the user is successfully registered.

In certain embodiments, the digitally signed data includes an identifier of the second server processing system, wherein the method includes the server processing system requesting a copy of a digital certificate from a certificate authority using the identifier of the second server processing system in order to verify the digitally signed data.

In certain embodiments, the digitally signed data includes one or more conditions, wherein the method includes the server processing system determining whether the one or more conditions are satisfied in order to register the entity.

In a second aspect there is provided a server processing system configured to:

receive digitally signed rating data issued by a second server processing system in order for an entity to register for a service associated with the server processing system, the rating data being indicative of an identity verification rating for the entity;

verify that the rating data has been issued by the second server processing system based on a digital signature associated with the rating data; and use the identity verification rating to register the entity in the event that the rating data is successfully verified as being issued by the second server processing system.

In certain embodiments, the server processing system is configured to receive the digitally signed data from a relying party processing system offering the service upon successful identity verification.

In certain embodiments, the server processing system is configured to receive from the relying party, a request to authenticate the user to access the service after registration, wherein the server processing system transfers a response to the relying party indicative of the authentication result.

In certain embodiments, the rating data is indicative of an authentication technology rating, wherein the server processing system is configured to authenticate the user according to the authentication technology rating.

In certain embodiments, the server processing system is configured to:

receive, from a relying party processing system associated with the relying party, the request to authenticate the user;

transfer, to the entity or an entity device associated with the entity, an index corresponding to a selected key from a keymap, wherein the keymap is stored in memory of the entity device and in server accessible memory;

receive data indicative of a code, wherein the user determines the code based on the selected key presented by the entity device and a personal identifier;

determine, a hash value of the personal identifier using the code and the selected key stored in the server accessible memory;

compare the determined hash value against a stored hash value associated with a user account stored in the server accessible memory; and transfer the response to the relying party processing system, wherein the response is indicative of whether the user is authenticated for accessing the service based on the comparison.

In certain embodiments, the server processing system is configured to compare the identity verification rating against a threshold identity verification rating, wherein in the event that the identity verification rating satisfies the threshold identity verification rating, the user is successfully registered.

In certain embodiments, the digitally signed data includes an identifier of the second server processing system, wherein the server processing system is configured to request a copy of a digital certificate from a certificate authority using the identifier of the second server processing system in order to verify the digitally signed data.

In certain embodiments, the digitally signed data includes one or more conditions, wherein the server processing system is configured to determine whether the one or more conditions are satisfied in order to register the entity.

In a third aspect there is provided a computer readable medium including executable instructions, wherein the executable instructions configure the server processing system to:

receive digitally signed rating data issued by a second server processing system in order for an entity to register for a service associated with the server processing system, the rating data being indicative of an identity verification rating for the entity;

verify that the rating data has been issued by the second server processing system based on a digital signature associated with the rating data; and use the identity verification rating to register the entity in the event that the rating data is successfully verified as being issued by the second server processing system.

In certain embodiments, the executable instructions configure the server processing system to receive the digitally signed data from a relying party processing system offering the service upon successful identity verification.

In certain embodiments, the executable instructions configure the server processing system to receive from the relying party, a request to authenticate the user to access the service after registration, wherein the server processing system transfers a response to the relying party indicative of the authentication result.

In certain embodiments, the rating data is indicative of an authentication technology rating, wherein the executable instructions configure the server processing system to authenticate the user according to the authentication technology rating.

In certain embodiments, the executable instructions configure the server processing system to:

receive, from a relying party processing system associated with the relying party, the request to authenticate the user;

transfer, to the entity or an entity device associated with the entity, an index corresponding to a selected key from a keymap, wherein the keymap is stored in memory of the entity device and in server accessible memory;

receive data indicative of a code, wherein the user determines the code based on the selected key presented by the entity device and a personal identifier;

determine, a hash value of the personal identifier using the code and the selected key stored in the server accessible memory;

compare the determined hash value against a stored hash value associated with a user account stored in the server accessible memory; and transfer the response to the relying party processing system, wherein the response is indicative of whether the user is authenticated for accessing the service based on the comparison.

In certain embodiments, the executable instructions configure the server processing system to compare the identity verification rating against a threshold identity verification rating, wherein in the event that the identity verification rating satisfies the threshold identity verification rating, the user is successfully registered.

In certain embodiments, the digitally signed data includes an identifier of the second server processing system, wherein the executable instructions configure the server processing system to request a copy of a digital certificate from a certificate authority using the identifier of the second server processing system in order to verify the digitally signed data.

In certain embodiments, the digitally signed data includes one or more conditions, wherein the executable instructions configure the server processing system to determine whether the one or more conditions are satisfied in order to register the entity.

Other aspects and embodiments will be appreciated throughout the description.

BRIEF DESCRIPTION OF THE FIGURES

Example embodiments should become apparent from the following description, which is given by way of example only, of at least one preferred but non-limiting embodiment, described in connection with the accompanying figures.

DESCRIPTION OF THE PREFERRED EMBODIMENTS

Figure 1:
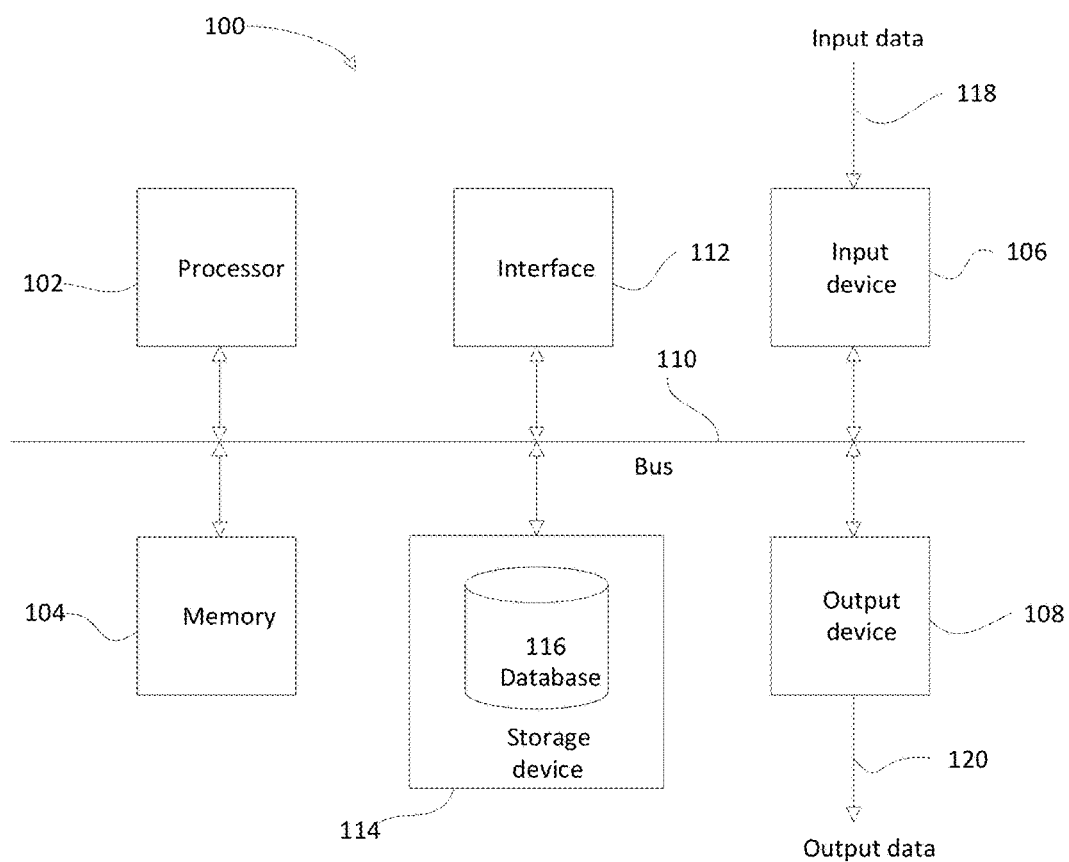
FIG. 1 illustrates a functional block diagram of an example processing system that can be utilised to embody or give effect to a particular embodiment.

The following modes, given by way of example only, are described in order to provide a more precise understanding of the subject matter of a preferred embodiment or embodiments. In the figures, incorporated to illustrate features of an example embodiment, like reference numerals are used to identify like parts throughout the figures.

Figure 2:
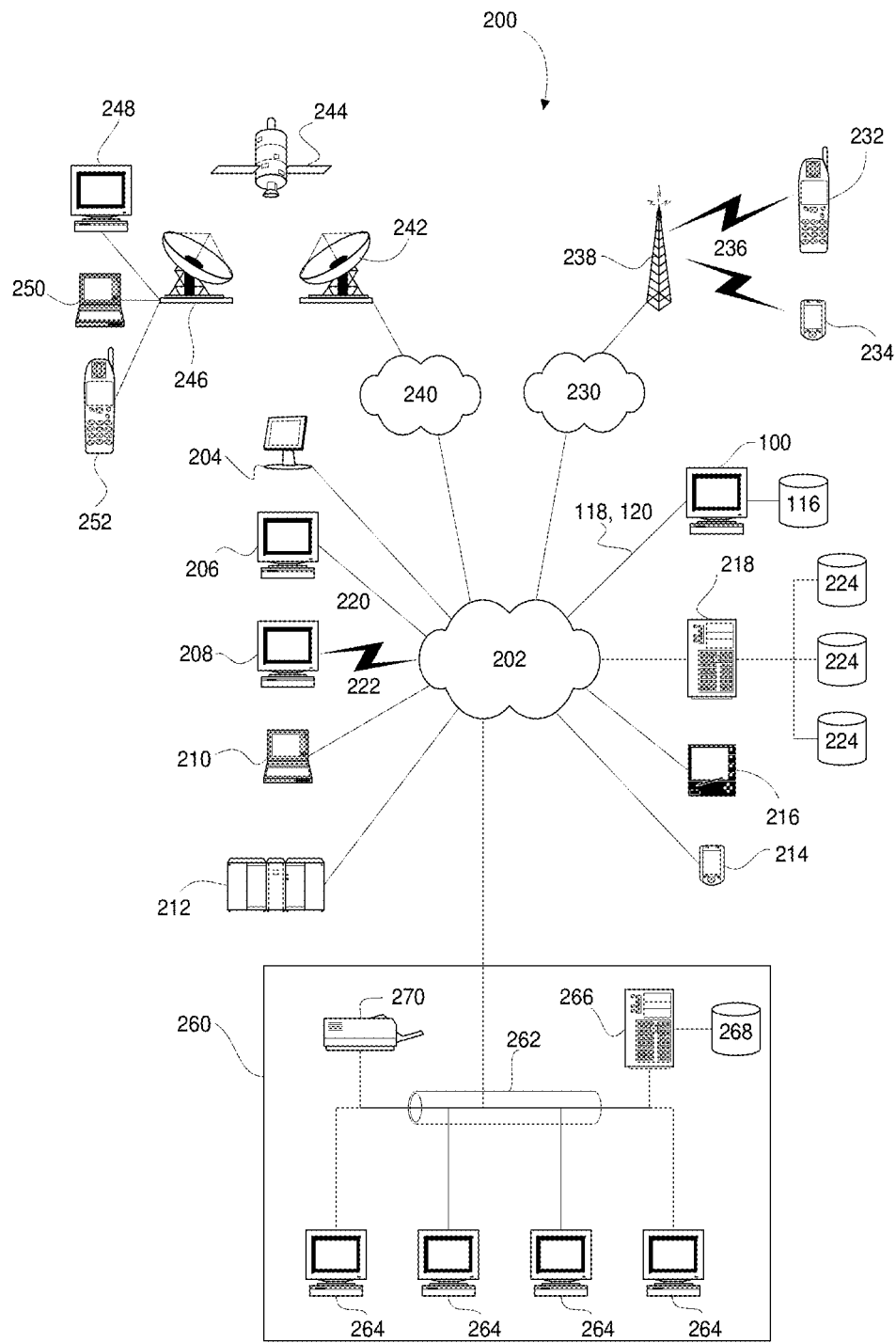
FIG. 2 illustrates an example network infrastructure that can be utilised to embody or give effect to a particular embodiment.
Figure 3:
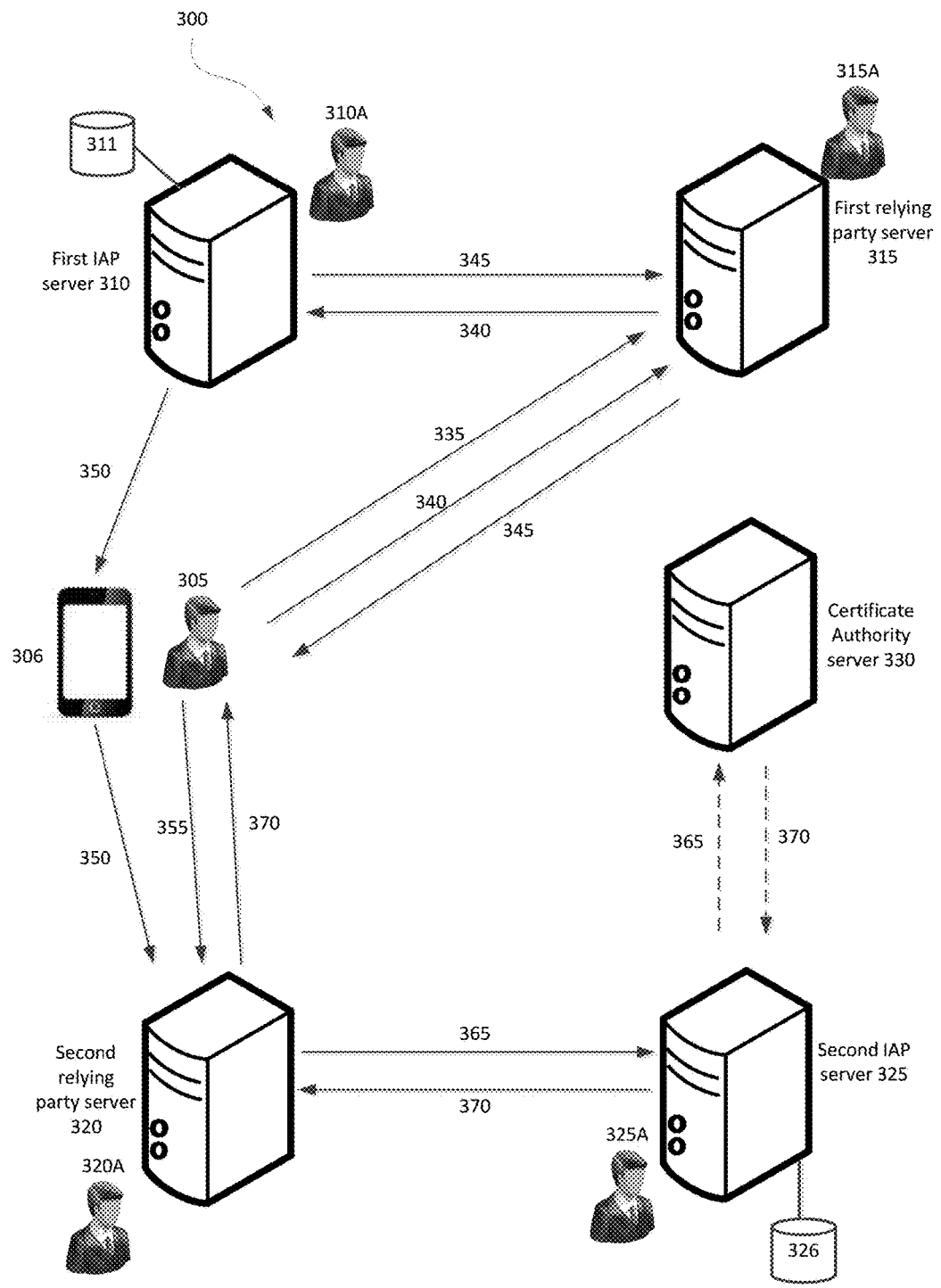
FIG. 3 illustrates a system diagram of a system for identity verification and authentication.

Referring to FIG. 3 there is shown a system 300 including a first relying party server processing system 315, a second relying party server processing system 320, a first identity authentication provider (IAP) server processing system 310, a second IAP server processing system 325, and an entity processing system 306 operated by an entity 305 (e.g. a user). Each processing system 315, 320, 310, 325, 306 can be provided in the form of processing system 100 and can be interconnected as discussed in FIG. 2 via a network such as the Internet. A first relay party 315A is associated with the first relying party server processing system 315, the second relying party 320A is associated with the second relaying party server processing system 320, a first IAP 310A is associated with the first IAP server processing system 310, a second IPA 325 is associated with the second IAP server processing system 320.

Figure 4:
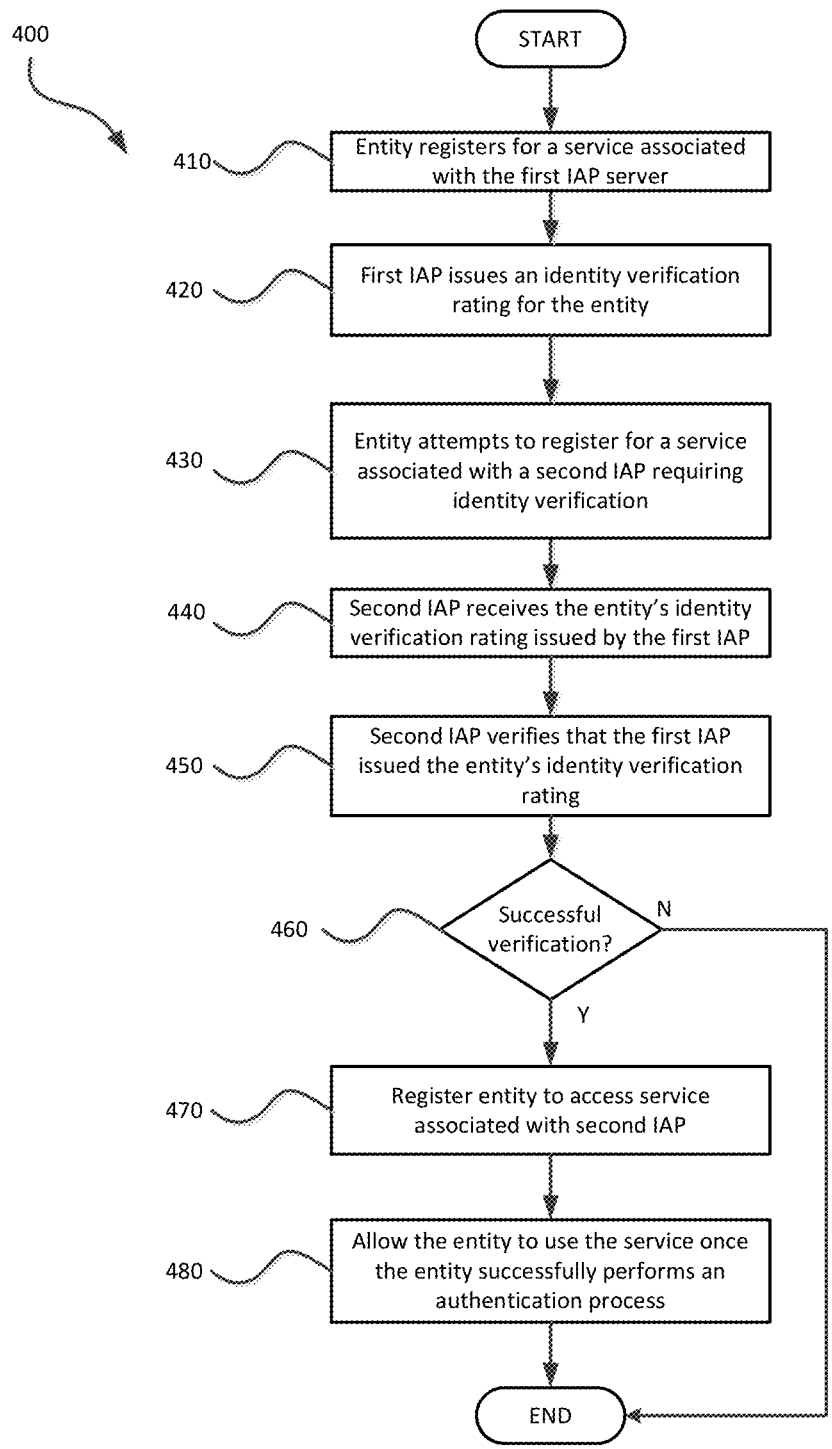
FIG. 4 illustrates a flow chart of an example method of an entity registering for a first and second service associated with a first and second identity authentication provider (IAP) using identity verification.

Referring to FIG. 4 there is shown a flow chart 400 representing a method of performing identity verification of the entity 305.

In particular, at step 410, the entity 305 registers for a first service associated with or controlled by the first IAP server processing system 315. The first service may be offered by the first relying party 310A which relies upon the first IAP server processing system 315 to perform identity authentication on behalf of the first relying party 310A. However, it is possible that the first service may be offered by the first IAP 310A via the first IAP server processing system 310 and thus there is no first relying party 310A.

At step 420, the first IAP server processing system 310 issues to the entity device 306 an identity verification rating 350 indicative of a level of assurance of the verification of the identity of the entity 305. The entity device 306 stores the identity verification rating 350 in memory.

At step 430, the entity 305 requests to register for a second service associated with or controlled by the second IAP server processing system 325. The second service may be offered by the second relying party 320 who relies upon the second IAP server processing system 325 to perform identity authentication on behalf of the second relying party 320A. However, it is possible that the first service may be offered by the second IAP 325 and thus there is no second relying party 320A.

At step 440, the second IAP server processing system 325 receives from the entity device 306 the identity verification rating 350 issued by the first IAP server processing system 310.

At step 450, the second IAP server processing system 325 verifies that the identity verification rating 350 has been issued by the first IAP 310A. In the event that the verification has been successful (step 460), the method proceeds to step 470, otherwise the method ends due to the entity 305 being unable to register for the second service based on the identity verification rating 350.

At step 470, the second IAP server processing system 325 registers the entity 305 to access the second service, subject to authentication, based on the verification that the identity verification rating 350 was issued by the first IAP server 310.

At step 480, the second IAP server 325 allows the entity 305 to use the second service in accordance with the identity verification rating 350.

It will be appreciated that due to the second IAP server processing system 325 being able to leverage the previous identity verification performed by the first IAP server processing system 310, the second IAP server processing system 325 does not need to be provided with identification information 340 (such as driver's license, birth certificate, etc) to verify the entity's 305 identity. This allows distributed relationships that are not dependant on a single source of credential distribution. Nor are pre-established relationships of trust necessary between relying parties or identity assurance providers.

Figure 5:
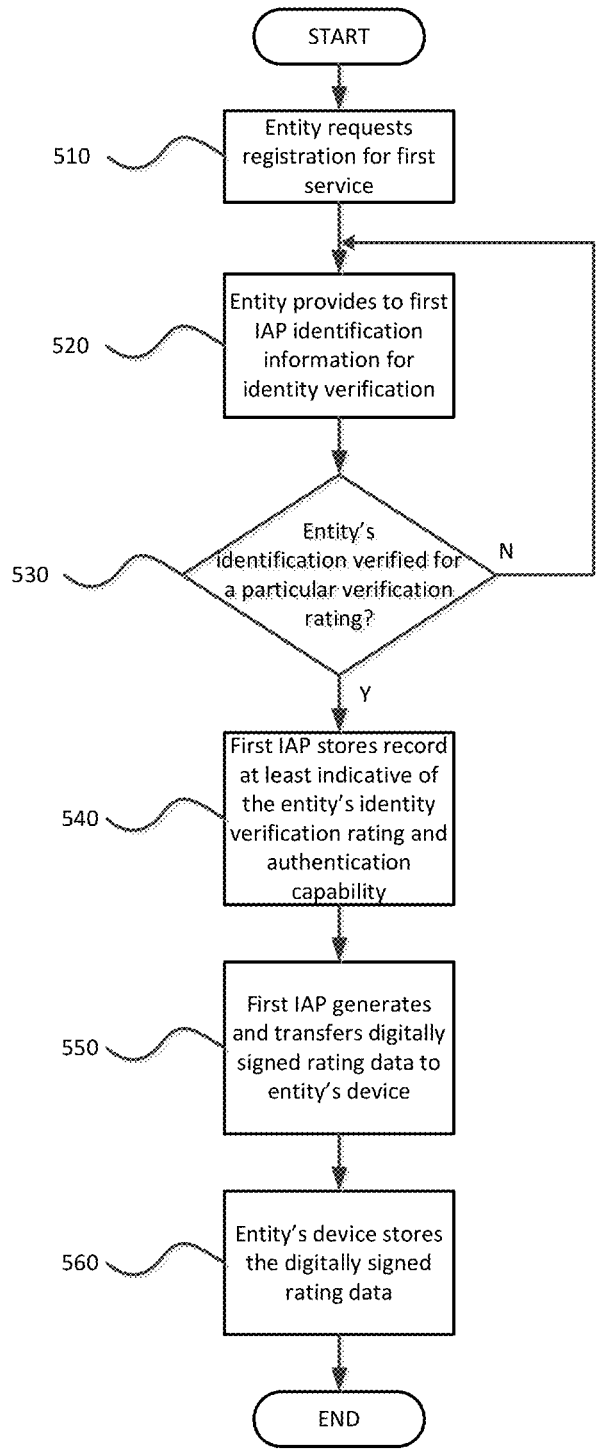
FIG. 5 illustrates a flow chart of an example method of an entity registering for a first service offered by a first relying party.

Referring to FIG. 5 there is shown a flow chart 500 of the entity 305 registering with the first relying party server processing system 315 such that digitally signed rating data 350 is issued to the entity 305. This flow chart 500 will be described with reference to FIG. 3.

In particular, at step 510 the method 500 includes the entity 305 requesting registration 335 for a service offered or controlled by the first relying party 315A.

At step 520, the entity 305 provides the first relying party 315A or the first relaying party server processing system 315 or an identity verifying processing system with the identification information 340 to verify the entity's identity. It is possible that the first relying party 315A or first relaying party server processing system 315 may verify the identity of the entity 305 based on the identification information 340. However, in other instances, the first relying party server processing system 315 may transfer a request to the identity verifying processing system to perform the identity verification.

At step 530, in the event that the identity of the entity 305 has been successfully verified, a request 342 is transferred to the first IAP server processing system 310 to record an identification verification record for the entity 305 in a data store 311. The first IAP server processing system 310 additionally assigns a unique identifier to the identification verification record to identify the entity 305.

At step 540, the first IAP server processing system 310 generates rating data indicative of an identity verification rating and an authentication capability rating for the entity 305. The first IAP may utilise a list of various identity verification methods and authentication methods. This list is stored by in memory of each IAP server processing system in the verification network or hosted by another processing system which is accessible by each IAP.

The identity verification rating is indicative of the first IAP's 310A level of assurance of the entity's 305 verified identity. In one particular form, the identity verification rating may be indicative of a score between 0 and 4, wherein 0 is the lowest assurance level and 4 is the highest assurance level. It will be appreciated that various levels of identity verification ratings can be utilised.

The authentication capability rating may be indicative of a score indicating a class of authentication technology or technologies that the entity 305 is able to utilise for authentication processes performed when attempting to perform a transaction when accessing the registered service. For example, the authentication capability rating may be a score ranging between 0 to 4, where an authentication capability rating of 0 indicates that the entity 305 is only able to utilise the least secure authentication technologies available, whereas an authentication capability rating of 4 indicates that the entity 305 is able to utilise the most secure authentication technologies available as well as the less secure authentication technologies available for authentication capability ratings 0, 1, 2 and 3. It will be appreciated that various levels of authentication capability ratings can be utilised.

At step 550, the digitally signed rating data 350 indicative of the identity verification rating and the authentication capability rating is transferred from the first IAP server processing system 310 to the entity device 306 associated with the entity 305. Additionally, the rating data 350 may be further indicative of the entity identity and the first IAP's identity. In one form, the entity device 305 is a mobile device associated with the entity such as a smartphone, tablet processing system, laptop or the like. The digitally signed rating data 350 is stored in memory of the entity device 306. The rating data 350 can be sent directly to the entity device 306 or indirectly or via another processing system. The entity's device 306 records the digitally signed rating data 350 in memory.

In the event it is required, the entity 305 can then complete the remaining registration process with the first relying party 315A in order to be successfully registered to access a service provided or controlled by the first relying party 315A.

Figure 6A:
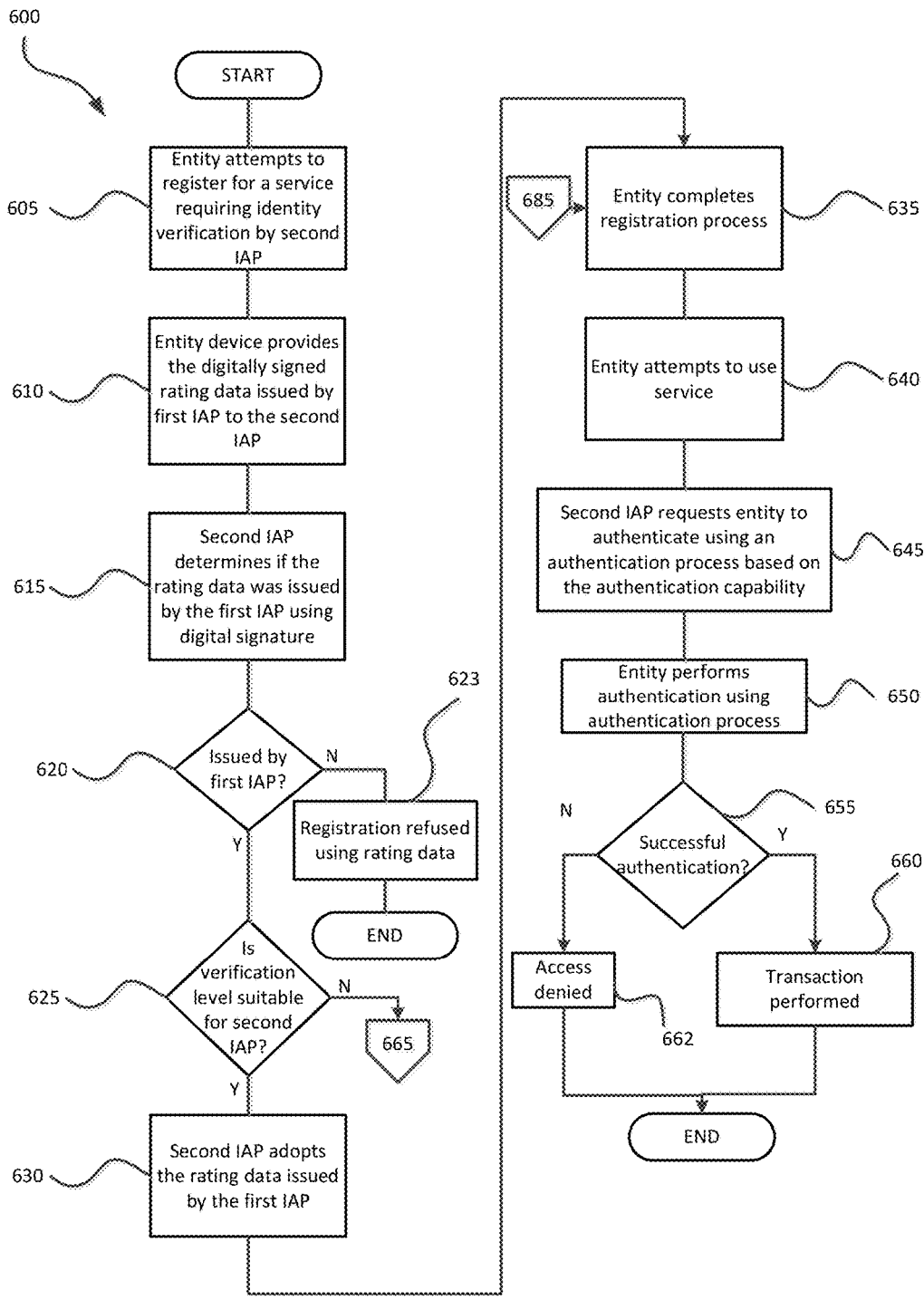
FIGS. 6A and 6B illustrates a flow chart of an example method of an entity registering for a second service offered by a second relying party utilising rating data issued by the first IAP.
Figure 6B:
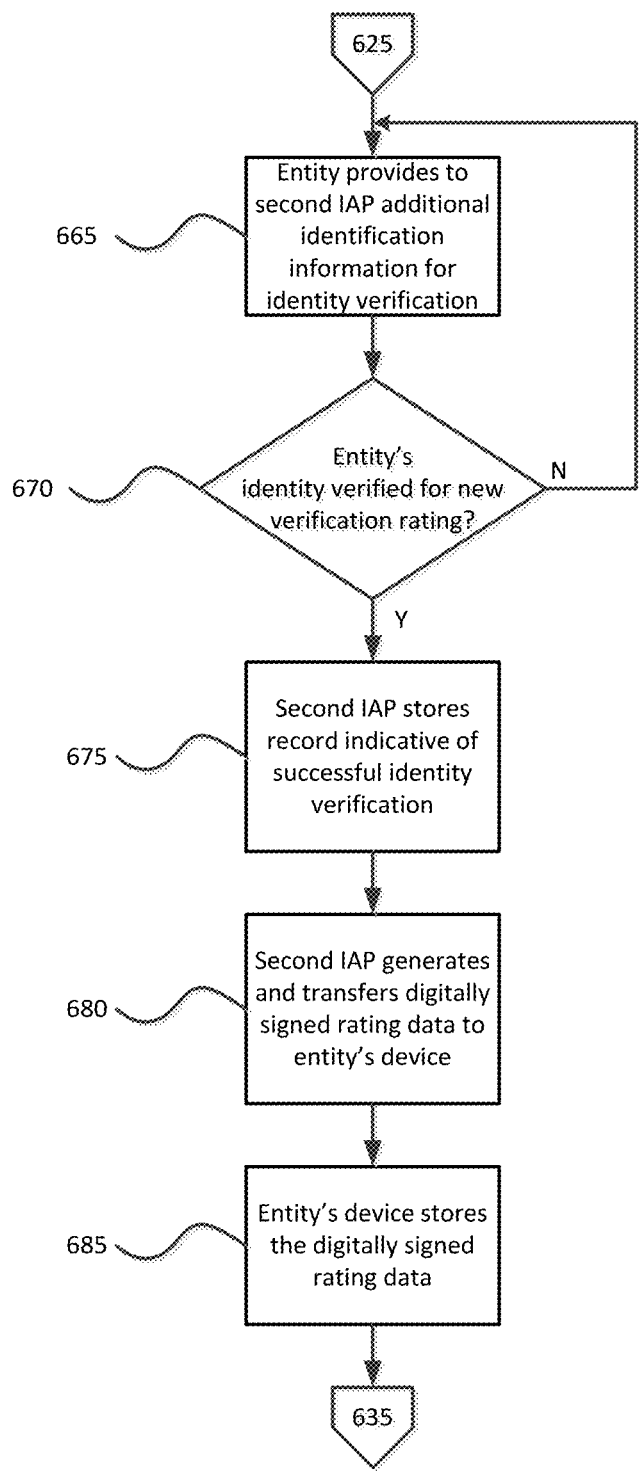

Referring to FIGS. 6A and 6B there is shown a flow chart 600 of a method for the entity to register with the second relying party 320A utilising the digitally signed rating data 350 issued by the first IAP server processing system 310. This flow chart 600 will be described with reference to FIG. 3.

At step 605, a registration request 355 is transferred to the second relying party server processing system 320 similar to that of step 510.

At step 610, the entity 305 can operate the entity device 306 to transfer to the second IAP server processing system 325 the digitally signed rating data 350 previously received from the first IAP server processing system 310. The entity device 306 may supply the digitally signed rating data 350 to the second relying party server processing system 320 which in turn forwards the digitally signed rating data 350 to the second IAP server processing system 325 for processing. It will be appreciated that the entity device 306 may directly transfer the digitally signed rating data 350 to the second IAP server processing system 325 rather than via the second relying party 320.

At step 615, the second IAP server processing system 325 attempts to verify that the digitally received rating data 350 has indeed been issued by the first IAP 310A. In particular, the second IAP server processing system 325 uses digital signature verification techniques using digital certificates to verify that the rating data 350 provided by the entity 305 was indeed issued by the first IAP 310A. This process can include the second IAP server processing system 325 transferring a request 365 to a certificate authority 330 to obtain a copy of a public certificate for the first IAP 310A to perform digital signature verification. Additionally, the public certificate can be used to verify the identity of the first IAP 310A and to ensure that the digital certificate used by the first IAP 310A for signing the rating data 350 is valid.

At step 620, if the second IAP server processing system 325 determines that the rating data 350 was issued by the first IAP 310, the method proceeds to step 625. Otherwise, the method proceeds to step 1120 where the second IAP server 325 refuses registration using the rating data 350 provided by the entity 305. The entity device 306 may provide alternate rating data 350 stored in memory of the entity device 306 which may have been issued by another IAP server processing system to attempt to verify the identity of the entity 305. If no alternate rating data can be provided, the entity 305 may be required to provide identification information 340 to enable the second IAP server 325 to verify the entity's identity such that the entity 305 can register for the service with or controlled by the second relying party 320A.

At step 625, upon successfully verifying that the rating data 350 was issued by the first IAP 310A, the second IAP server processing system 325 may further determine whether the entity 305 has an authentication capability rating which is sufficient to access a service offered or controlled by the second relying party 320A. If yes, the method proceeds to step 630, if no the method proceeds to step 665 which will be discussed later.

At step 630, the method includes the second IAP server processing system 325 using the identity verification rating and authentication capability rating indicated by the rating data 350 that was issued by the first IAP server processing system 310 for registering the entity. A response 370 can be transferred from the second IAP server processing system 325 to the second relying party server processing system 320 indicating that the identity verification of the entity 305 was successful, wherein this response 370 can be provided to the entity 305 as feedback.

At step 635, the method includes the entity 305 completing the registration process with the second relying party 320A if required.

At step 640, the method includes the entity 305 attempting to use the service offered or controlled by the second relying party 320A. The service offered or controlled by the second relying party 320A can only be utilised by the entity 305 upon authentication of the entity 305. As such, when the entity 305 requests access to the service offered or controlled by the second relying party 320, the second relying party requests the second IAP server processing system 325 to handle the entity authentication process on behalf of the second relying party 320A. Upon receiving an indication from the second IAP server processing system 325 of successful authentication, the second relying party server processing system 320 allows the entity to utilise the service.

At step 645, the method includes the second IAP server processing system 325 requesting the entity 305 to undergo authentication using a suitable authentication technology based on the authentication capability rating. The second IAP server processing system 325 determines the authentication capability of the entity 305 from stored records of rating data in the data store 326. The second IAP server processing system 325 then requests the entity 305 to perform authentication using an authentication technology which the entity is capable of utilising. For example, the second IAP server processing system 325 may determine that the authentication capability rating of the entity 305 enables the second IAP server processing system 325 to utilise user authentication processes described in International Patent Application PCT/AU2014/050024, the contents of which is herein incorporated by cross-reference. The authentication method will be described later herein.

At step 650, the method includes the entity 305 attempting to perform the authentication process with the second IAP server processing system 325 using the required authentication technology. At step 655, the second IAP server processing system 325 determines whether the authentication has been successful. In the event that the authentication has been successful at step 655, the method proceeds to step 660 wherein the second IAP server processing system 325 can indicate to the second relying party 320 that the entity 305 has been authenticated and should be granted access to the service offered or controlled by the second relying party 320A, thereby allowing the entity 305 to perform a transaction in accordance with the identity verification rating.

In the event that authentication of the entity 305 has been unsuccessful at step 655, the method proceeds to step 662 where the second IAP server processing system 325 indicates to the second relying party server processing system 320 that the entity 305 has not been authenticated and should not be granted access to the service offered or controlled by the second relying party 320A such that the method ends. It will be appreciated that the authentication process could be performed multiple times in the event that the entity 305 successively fails to be authenticated until a threshold number of authentication failures have been reached prior to the second IAP server processing system 325 indicating to the second relying party server processing system 325 that access to the service should be denied.

As discussed earlier in relation to step 625, in the event that the second IAP server processing system 325 determines that the entity has an insufficient identity verification rating to access the service offered or controlled by the second relying party 320A, the method can proceed to step 665 shown in FIG. 6B. In particular, at step 665 the entity provides additional identification information 340 to an identification verification processing system for verification.

At step 670, the second IAP server processing system 325 is notified by the identification verification processing system whether the additional identification information has resulted in the entity's identity being verified at an assurance rating which is sufficient to access the second service offered by the second relying party 320. In the event that an insufficient identity verification rating has been achieved, the method may return back to step 670 where the entity 305 is requested to provide further additional material 340 to verify the identity of the entity 305, or the method ends. In the event that entity 305 has been verified to the new verification rating, the method proceeds to step 675.

At step 675, the method includes the second IAP server processing system storing a record in the data store 326 indicative of the entity's identity having been verified to a more assured identity verification rating. At step 680, the method includes the second IAP server processing system 325 generating and transferring to the entity's device 306 the new rating data 350 indicative of the new identity verification rating. At step 685, the method includes the entity's device 306 storing the new rating data 350 in memory. The method then returns to step 635 as shown in FIG. 6A due the entity 305 having now obtained an identity verification rating sufficient to access the second service offered by the second relying party 320.

The example embodiments utilise digital certificates for an IAP to digitally sign the rating data 350 which can then be shared with another IAP for identity verification. In particular variations, the rating data 350 may be digitally signed including a temporal expiration. Upon establishing a relationship with the initial identity assurance provider, the user is issued rating data having a time-to-live (TTL) property. The TTL property is sufficiently long that the entity will not have to constantly request identity verification, but sufficiently short that if rating data is revoked by the original IAP, the cached copy of the digitally signed rating data will expire readily. The TTL may be based on the user's identity verification rating, with more assured identity verification ratings resulting in rating data 350 being signed to expire sooner giving preference to security over convenience. In the event that the TTL property of the digitally signed rating data has expired and is provided to a IAP server, the IAP server will refuse to verify the entity's identity using the expired rating data 350. The entity 305 is thus required to re-establish a connection with the original IAP server and obtain a newly signed version of the rating data 350 which can then be provided to the new IAP server for verification. The rating data 350 may additionally or alternatively be signed with condition properties which may be dependent upon business rules to indicate if the digitally signed rating data 350 is valid and active. It will be appreciated that various TTL and/or business rule properties may be associated with the digitally signed rating data 350 based on the level of assurance provided by the IAP who issued the rating data.

In another embodiment, whilst it is only necessary that the rating data 350 be digitally signed by a single IAP, it is possible that multiple IAPs may digitally sign the same rating data 350. In the event that one of the IAPs are compromised, the rating data 350 which has been signed by multiple IAPs does not then require revocation. Furthermore, where multiple IAPs sign the same rating data 350, the time of issue of the certificate can be agreed by the multiple IAPs. This can allow revocation of only the rating data 350 issued after a compromise occurs.

Figure 7:
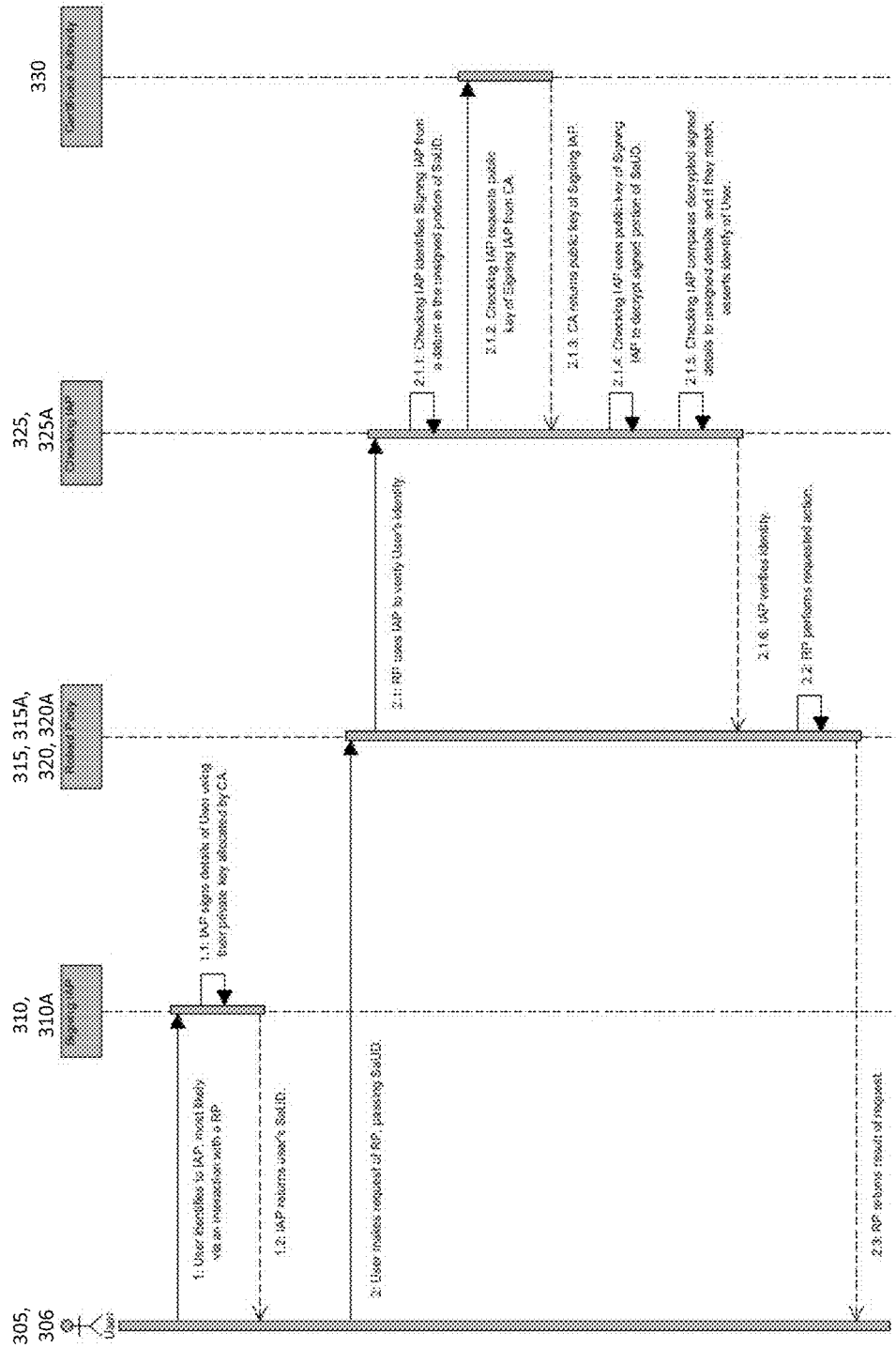
FIG. 7 illustrates a sequence diagram of an example method for performing identity verification.

FIG. 7 shows a sequence diagram for providing distributed identity verification utilizing public-key infrastructure. In particular, the first IAP 310A that has identified a user 305 signs user's details including the rating data using the first IAP's private key. This first IAP 310A is referred to as the signing IAP to distinguish it from other IAPs. The signing IAP 310A passes both the Signed and Unsigned Details (SaUD) of the user (i.e. the entity as referred to above) back to the user device 306 (i.e. the entity processing system 306 as referred to above). The user 305 can then use the SaUD stored by the user device as a token when making requests of other associated systems.

When making such a request to use a service of a relying party 320A, the user passes their SaUD from the user device 306 to the relying party processing system 320. The relying party processing system 320 passes the user's SaUD on to the corresponding second IAP processing system 325 referred to in this example as the checking IAP. The checking IAP processing system 325 then attempts to verify that the signed and unsigned variants of the SaUD are the same. To achieve this, the checking IAP processing system:
1. identifies the signing IAP 310A (from a field in the unsigned details);
2. requests the public key of the signing IAP 310A from a trusted Certificate Authority (CA) 330;
3. uses the signing IAP's public key to decrypt the signed portion of the SaUD; and
4. compares the decrypted signed portion of the SaUD to the unsigned portion.

Presuming the two portions of the SaUD match, the user's identity claim 1s asserted by the checking IAP 325A and this verification is passed back to the relying party 320A and/or relying party processing system 320 who can proceed with the request.

It will be appreciated that in the trivial case where the signing IAP 310A is also the checking IAP 325A, there is no need to contact the CA 330 to retrieve the certificate as it is likely stored locally. Additional checks may be made to ensure the SaUD contains the latest data for the user (assuming the user's details are stored at the signing IAP). If the details are old/incorrect, rejecting the SaUD and requiring the user to reauthenticate may occur.

If the certificate of the signing IAP 310 is unrecognised/untrusted by the checking IAP 325, the checking IAP 325 should refuse to verify the user.

Known/trusted IAPs can be registered in one of two ways:
a static white list of IAPs, which is updated when new IAPs are added; or,
a static white list of root certificates, such that any IAP whose certificate is signed by a given root certificate is considered trusted.

If the SaUD contains illogical data (such as the Issue Datetime is in the future), the SaUD should be rejected. In addition, a record may be stored indicative of the signing IAP 310 having issued an illogical SaUD which can be sent to an identity verification administrator as this may be a sign that the signing IAP 310 has been compromised.

Transmission of the SaUD preferably occurs over an encrypted channel such as HTTPS.

The SaUD includes two parts:
an unsigned data structure; and
the signed variant of that data structure.

The unsigned variant may be any data structure that is agreed (e.g. an XML data structure). It should be relatively small in order to reduce overhead on transactions that carry it, but it should also be extensible (ability to add new data as required) and fast to process.

It is preferable that the signed variant includes an exact replicate of the unsigned variant, as this simplifies matching algorithms.

The SaUD can also include the following data:

| Field | Description |
| --- | --- |
| User ID | A unique identifier associated with the user. |
| IAP ID | A unique identifier associated with the signing IAP. |
| Issue Datetime | The UTC datetime at which this version of the SaUD was issued (effectively, when the user last authenticated). |

Additionally, the user rating (also referred to as a score) and other data can form part of the SaUD data structure.

Security is significantly stronger if the data structure is signed as a whole, rather than each individual field being signed.

The User ID preferably is globally unique. As there is no direct communication between IAPs, possible ways to generate such an identifier include:
Prepend the identifier with the IAP ID.
Generate a Universally Unique Identifier (UUID).

Prepending the identifier with the IAP ID is the preferred mechanism, as this is guaranteed unique and not subject to trusting a user assertion. Even if other IAPs are to store data about the user, they should store it against the same User ID (i.e. one that is prepended with the original signing IAP's identifier).

Failing this, a UUID is a suitable alternative which is a randomly generated identifier. While UUIDs aren't guaranteed unique, the chance of a duplicate occurring is infinitesimal. As UUIDs are random, no coordination between IAPs is required in order to issue them.

The IAP ID should allow for easy identification of a signing IAP, without the checking IAP needing to be aware of the signing IAP's existence. This is due to the mechanism of potentially trusting all IAPs with certificates signed by a trusted root certificate. Effectively, the IAP ID would provide an easy mechanism for the checking IAP to retrieve the signing IAP's certificate from a CA.

SaUDs can be issued with a Time to Live (TTL). After the TTL has passed, the SaUD is considered expired and the checking IAP should reject it. If the user fails to reauthenticate within a reasonable period of time, a record may be stored by the respective IAP as the expired SaUD may have been lifted from the user's cache or the subject of a replay attack.

The primary benefit of adding a TTL is to limit the damage to the user if a nefarious party has obtained their SaUD. When determining a TTL, security must be balanced with convenience: the shorter the TTL, the more secure the SaUD; the longer the TTL, the less the user is harassed to reauthenticate. The secondary benefit of adding a TTL is to simplify revocation of SaUDs. If TTLs are relatively short, no revocation process may be needed.

The TTL can be provided as an Expiration Datetime (UTC datetime after which the SaUD is considered expired), or a TTL delta (a timespan, such that the Expiration Datetime=Issue Datetime+TTL). In either case, it would be a datum in the SaUD.

Optionally, a default TTL may be added, such that if no TTL is specified the SaUD expires after the default duration has elapsed. In this case, all IAPs would need to have the same default to prevent inconsistent behaviour.

SaUD revocation is the ability to declare SaUDs invalid. This may be individual SaUDs, or groups of SaUDs (such as all SaUDs issued by a given server). SaUD revocation may occur for a number of reasons. A user whose account is deleted/deactivated should have their SaUD revoked. Failure to revoke their SaUD would enable them to continue to access RPs that used IAPs other than the signing IAP. If a given IAP is compromised, it may be necessary to revoke all SaUDs it has issued (as it is likely unknown whether those SaUDs were issued appropriately, or to the attacker). Failure to do so would enable the attacker to continue to impersonate the users whose SaUDs they retrieved. Even if a TTL is required, the attacker may have set a particularly long TTL.

Facilitating the revocation of SaUDs improves the security of the overall system. Allowing it to deal with scenarios such as compromise and account deactivation.

In the event that an IAP 310, 325 is compromised, the certificate of the IAP should be revoked and a new certificate issued. This should not require communication between the IAPs, as certificate revocation and issuing occurs at the CA 330 (which is the common, delocalized point of interaction between the IAPs). By reissuing the IAP's certificate, checking IAPs 325 will find that the new Public Key does not decrypt the signed portion of the SaUD correctly; they will therefore reject SaUDs issued using the previous certificate.

Even with communication between the IAPs, it is impossible (under the standard approach) to revoke just those SaUDs issued after the compromise took place. This is because a compromised IAP might have issued back-dated SaUDs. A mechanism would be required to guarantee the issuing time.

In relation to revocation of individual SaUDs, communication between the IAPs is required. This communication would be either from the signing IAP 310, notifying other potential checking IAPs 325 that a SaUD has been revoked, or checking IAPs 325 contacting the signing IAP 310 to check that each SaUD hasn't been revoked. It is preferred that a short TTL is implemented such that individual SaUD revocation can be avoided as implemented less frequently.

As discussed above, multiple TAPS can sign the SaUD. Specifically, there are two fashions in which multiple IAPs can sign a SaUD:

| Name | Description |
|---|---|
| Serial Signage | User details could be signed by one IAP, then the signed user details could be signed by a second IAP. Provided both IAPs know the user, this will provide additional security (as an attacker who compromises a single IAP will be unable to issue fake SaUDs). |
| Parallel Signage | User details could be signed by one IAP, then the unsigned details could be signed by a second IAP. This should only be done if both IAPs know the user. This will provide redundancy, in case, for example, one of the IAPs becomes compromised and its certificate needs to be revoked. |

In the case of Serial Signage, security is improved. An attacker who compromises one IAP and wishes to create or modify a user's details needs to convince a second IAP that the new or modified details are valid and should be added. Similarly, if the attacker wishes to issue a new SaUD for an existing user, they need to convince the second IAP 325 that the user has been authenticated. If implemented correctly, this should not be possible, leaving the only option for the attacker to compromise both IAPs.

In the case of Parallel Signage, redundancy is provided in case one signed variant of the user's details can no longer be verified. A checking IAP 325 would attempt to verify one signed variant of the user's details and if that failed they could attempt to verify the second variant. This technique may also be useful if there is a scenario where a one-way trust is required between IAPs (one group of IAPs only trust SaUDs signed within their group, while a second group of IAPs trust SaUDs signed within their group or within the first group). It is likely, however, that this would be much easier to implement by simply whitelisting the root certificate of both groups within the second group.

In both cases, the Issue Datetime of the SaUD is known to be genuine (even if one of the IAPs is compromised), as both IAPs have sighted and verified it.

Serial Signage:

An additional datum needs to be added to the SaUD, being the IAP ID of the second signer. Order (naming) of these data is important as the checking IAP 325 needs to know which certificate to decipher with first.

Signing IAPs 310 need to be aware of at least one other IAP, being the second signer. Ideally, this should be a random trusted IAP (as it will make it more difficult for the attacker to know which other IAP they need to compromise).

Both signing IAPs 310 have to be confident that the user is who they say they are. This means, at registration both signing IAPs need to independently go through user identity verification, and at SaUD reissue, both signing IAPs 310 need to authenticate the user. The user's registration or authentication details must be passed to one IAP, and then on to a second, not directly to both from the RP.

The second signing IAP must be passed both the signed and unsigned details. It must validate that the signed details match the unsigned details as a checking IAP would. It must also validate that the unsigned details match its details on record. This ensures that the first signing IAP isn't compromised. If the details do not match, the second signing IAP can record or report that the first signing IAP may have been compromised.

Checking IAPs need to retrieve both certificates and apply them in the correct order to decrypt (then verify) a SaUD.

Parallel Signage:

The SaUD must now contain one unsigned and two signed variants of the user's details.

An additional datum needs to be added to the SaUD, being the IAP ID of the second signer. Order (naming) of these and the order of the signed variants is import as (under most algorithms) the checking IAP needs to know which certificate to decipher with first.

Signing IAPs need to be aware of at least one other IAP, being the second signer.

Both signing IAPs have to be confident that the user is who they say they are. This means, at registration both signing IAPs need to independently go through user identity verification, and at SaUD reissue, both signing IAPs need to authenticate the user. The user's registration or authentication details will likely be passed to one IAP, and then on to a second, but they could be passed directly from the RP to two IAPs.

Checking IAPs may retrieve either certificates and apply it to decrypt (then verify) a SaUD. The certificate retrieved may be that of the first listed IAP, a random listed IAP, or a listed IAP determined by any other desired algorithm.

Figure 8:
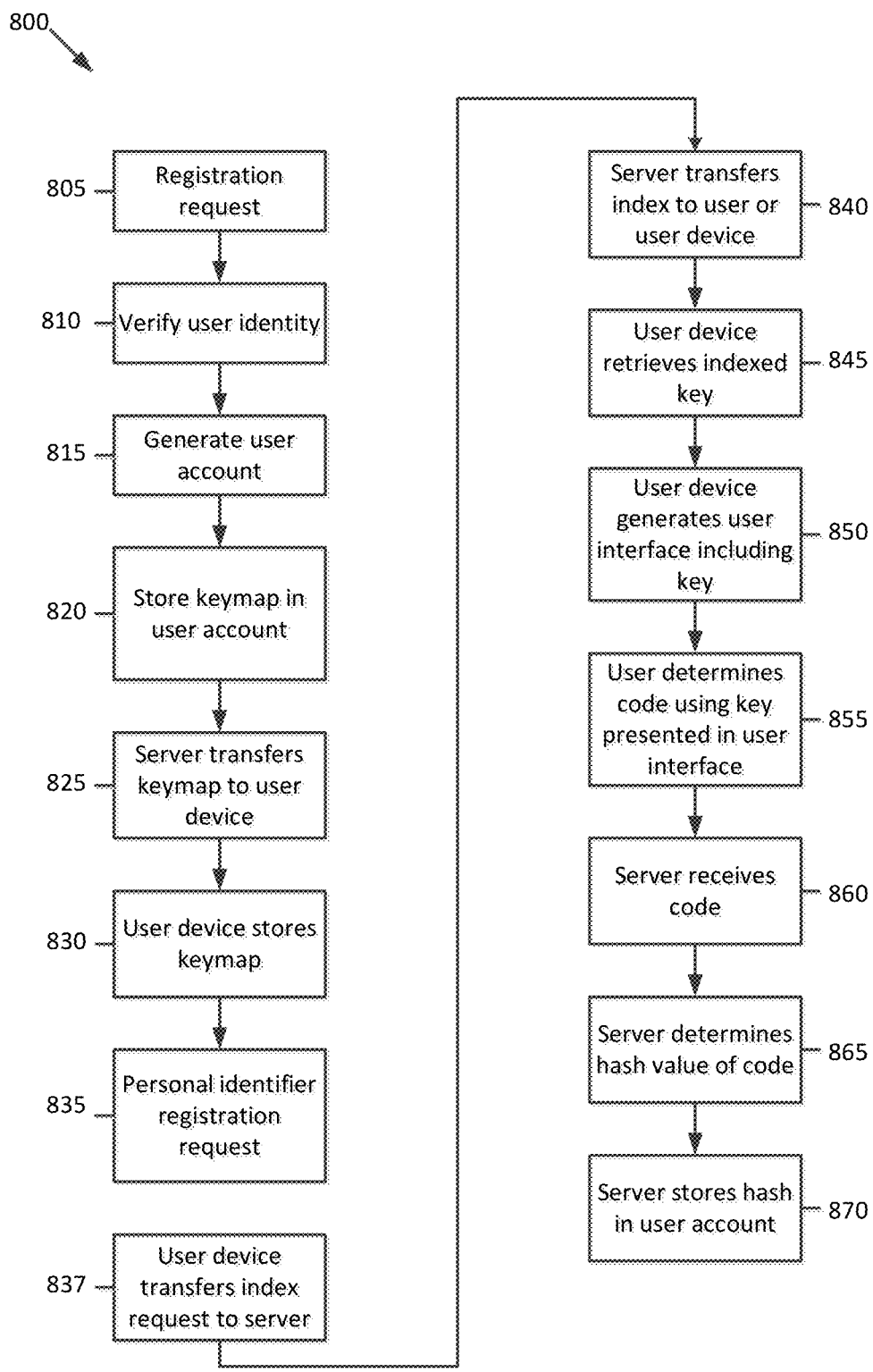
FIG. 8 illustrates a flow chart representing an example method performed by a server processing system to authenticate a user attempting to access a secure environment.

In particular embodiments, a conditional SaUD can be utilised where any additional conditions can be imposed. This might be that the SaUD is only valid:

on certain days or between certain times;
when coming from a certain IP address or geographic location;
for a specific IAP or RP; and/or
other conditions Referring to FIG. 8 there is shown a flow chart representing an example method 800 of a user registering with a server processing system for authenticating the user when accessing a secure environment controlled by the remote server processing system. In the context of the verification method and system described above, the user is the entity 305, the server processing system is an IAP 310, 325, the secure environment is an online service offered or controlled by the relying party 315A, 320A, and the remote server processing system is the relying party server processing system 315, 320. The method utilises a user device which in the context of the above examples is the entity device 306.

In particular, at step 805, the method 800 includes the user transferring a registration request to the server processing system 310, 325. The registration request may be transferred from the user device 306 and/or a user processing system 100 operated by the user 305. In particular, in the event that the registration request is submitted at least partially using the user device 306, this may be in response to the user installing a software application on the user device 306, launching the software application, and then the user interacting with the software application to submit the registration request. The registration request can be indicative of identity data which attempts to prove the identity of the user, and a unique device identifier indicative of the user device 306. The identity data may be indicative of credit card numbers, passport numbers, utility bills, addresses and other like information. In particular embodiments, the unique device identifier is a unique device profile which is generated by the software application. The software application determines a number of characteristics of the user device 306 and uses the determined characteristics to generate the unique device profile. The determined characteristics may include one or more characteristics of hardware of the user device (such as the CPU, memory), a MAC address of the user device, a software profile which may be indicative of a digital certificate associated with the user and one or more identifiers associated with the user device. The software application applies a hashing algorithm to the determined characteristics to generate the unique device profile in the form of a hash value. The unique device profile is then transferred to the server processing system 310, 325 for storage. The unique device profile acts as a device signature to uniquely identify the user device 306 based on multiple characteristics of the user device 306. In particular embodiments, the unique device profile is also stored in memory of the user device 306 and may be used for implementing a security check as will be explained in further detail later herein.

At step 810, the method 800 includes the server processing system 310, 325 facilitating verification of the identity of the user based on the identity data. In particular, a server processing system 310, 325 may utilise an identity verifier (IDV) in an attempt to verify that the set of information is associated with a single user. In response to a positive verification, the method proceeds to step 815. Otherwise the server processing system 310, 325 may request further identification information from the user.

At step 815, the method 800 includes the server processing system 310, 325 generating a user account in the memory associated with the server processing system 310, 325. The memory is preferably a database accessible by the server processing system 310, 325. The server processing system 310, 325 associates the user device with the user account based on the unique device identifier which in particular embodiments is the unique device profile.

Figure 11A:
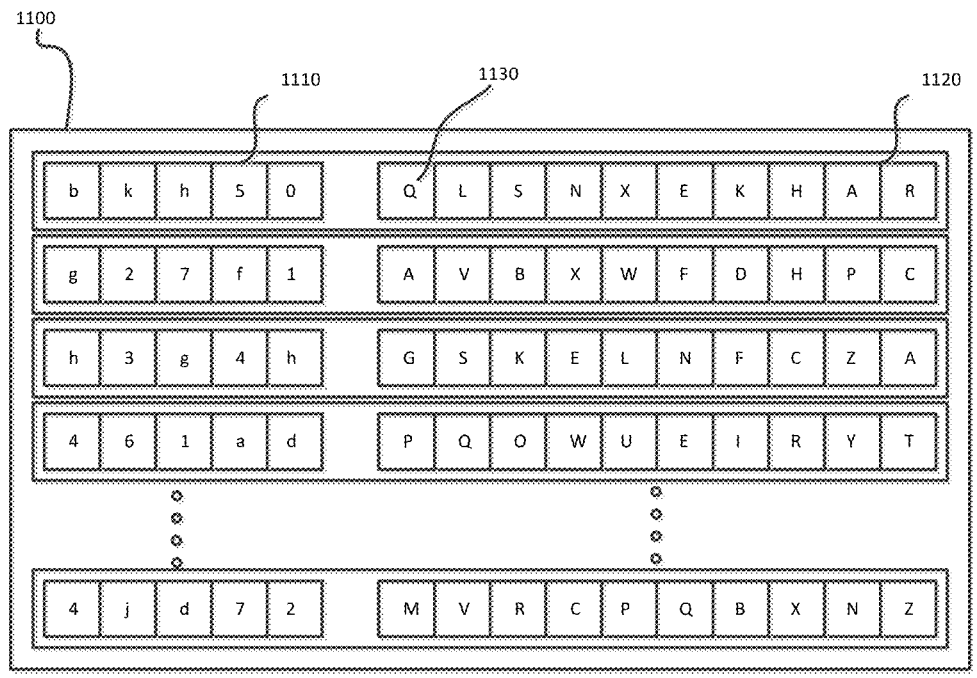
FIG. 11A illustrates an example keymap.

At step 820, the method 800 includes the server processing system 310, 325 storing an association between a keymap 1100 and the user account. In particular, each keymap 1100 includes plurality of unique keys 1120 associated therewith a unique index number 1110 (i.e. serial number). An example of a graphical representation of a keymap 1150 including a plurality of keys 1120 and associated indexes 1160 is shown in FIG. 11A. In particular, each key 1120 includes a plurality of unique key portions 1130. In this example, each key 1120 comprises alphabetic key portions, however other forms of keys could be utilised.

At step 825, the method 800 includes the server processing system 310, 325 transferring, to the user device 306, keymap data indicative of the plurality of indexed keys of the keymap 1100 associated with the user's account.

At step 830, the method 800 includes the user device 306 storing in local memory the keymap data.

At step 835, the method 800 includes the server processing system 310, 325 receiving a personal identifier registration request from the user. The personal identifier registration request may be received from the user processing system 100 or the user device 306. In response, the server processing system 310, 325 transfers to the user processing system 100 or the user device 306 a code request interface for presentation to the user requesting that the user input a code indirectly representing the desired personal identifier. The code request interface may be presented via a web-browser, web-enabled application or the like. The code request interface may be a webpage or a portion of a webpage that is presented to the user. For example, the code request interface may be a frame or window located within a webpage hosted by the remote server processing system 315, 320, wherein the code request interface can be generated and hosted by the server processing system 310, 325. As will be discussed in detail below, the code that is input by the user into the code request interface is transferred to the server processing system.

At step 837, the method 800 includes the user requesting, via the software application of the user device 306, an index from the server processing system 310, 325. The request is herein referred to as an index request. The index request is transferred from the user device 306 to the server processing system 310, 325, wherein the index request can be indicative of the user device profile and/or the identity of the user. The index request may be digitally signed using a private key associated with a digital certificate of the user as will be discussed in more detail herein.

At step 840, in response to receiving the index request, the method 800 includes the server processing system 310, 325 transferring, to the user device, an index 1110 indicative of a selected key 1120 from the keymap 1100 associated with the user account. The user device profile and/or the user identity can be used by the server processing system 310, 325 to determine the user account and appropriate keymap. In situations where the code request interface is presented via the user processing system 100 and the user device 306 is not in communication with the server processing system 310, 325, the server processing system 310, 325 can provide the index 1110 to the user via the user processing system 100. The user can then manually input the index into the software application using an input device of the user device 306. The user may be required to interact with the user processing system 100 to request transfer and presentation of the index 1110 to the user processing system.

At step 845, the method includes the user device 306 retrieving the corresponding key 1120 from the keymap 1100 stored in the local memory based on the received index 1110.

Figure 11B:
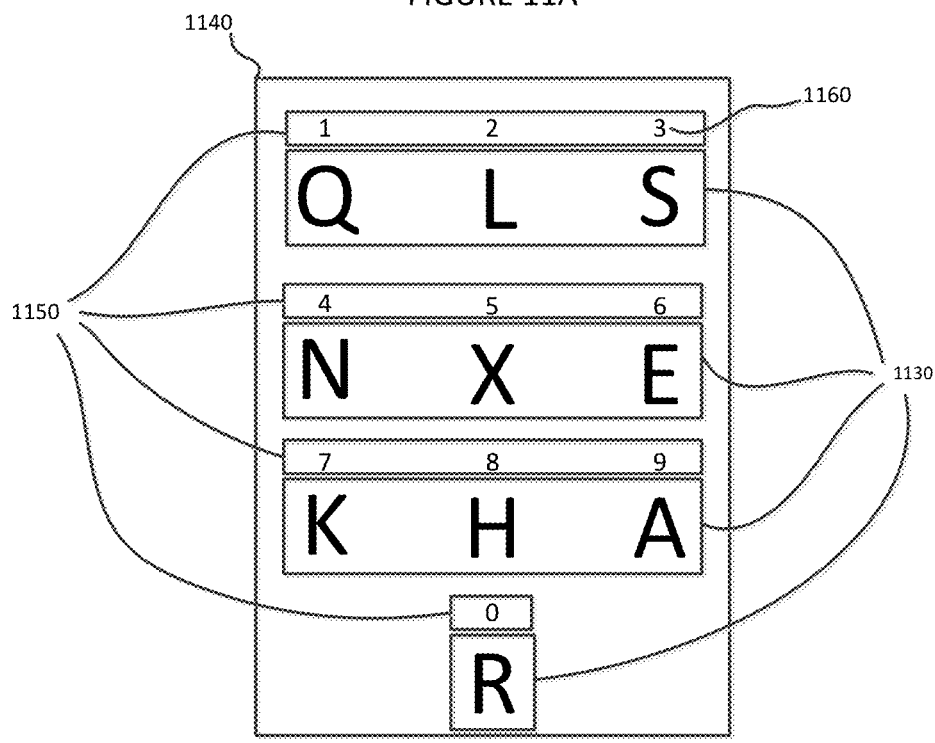
FIG. 11B illustrates an example user interface including a graphical representation of a key and an identifier reference.

At step 850, the method 800 includes the user device 330 generating and displaying a user interface 1140 on the user device 306, wherein the user interface 1140 of the software application presents a graphical representation of the key 1120 and an identifier reference 1150. Referring to FIG. 11B, there is shown an example user interface 1140 which presents the identifier reference 1150 as a numerical display including ten keys for the digits 0 to 9 in ascending order. As shown in FIG. 11B, the key 1120 can include a corresponding number of random alphabetic characters. Preferably, as shown in FIG. 11B, the user interface 1140 presents each key portion 1130 adjacent a corresponding identifier reference portion 1160 such that each digit of the identifier reference 1150 aligns with and is adjacent to the corresponding key portion 1130 of the key 1120. It will be appreciated that other configurations of alphanumerical data can be used for the key 1120 and the identifier reference 1150.

At step 855, the method 800 includes the user determining the code using the presented key and the desired personal identifier. In one form, the user can visually inspect the interface 1140 presented and determine the code. For example, for each digit of the desired personal identifier, the user identifies the key portion 1130 which corresponds to this digit 1160 in the identifier reference 1150. The key portions 1130 are concatenated together by the user to form the code. Based on the interface presented in FIG. 11B, if the user's desired personal identifier is "1032", the code for the user is "QRSL". In the event that the user is using the user device 306 to set the personal identifier, the user can interact with an input device of the user device to input the code into the code request interface wherein the code indirectly represents the desired personal identifier. Alternatively, if the user is using the user processing system to obtain access to the secure environment, the user can input, using an input device of the user processing system, the code into the code request interface presented by the user processing system.

At step 860, the method 800 includes the user device 306 or the user processing system 100 transferring, to the server processing system 310, 325, a response indicative of the code input by the user into the code request interface. The code request interface presented by the user device 306 or user processing system 100 can include a submit button, wherein the code can be transferred from the user device 306 or user processing system 100 to the server processing system 310, 325 via user selection of the submit button.

At step 865, the method 800 includes the server processing system 310, 325 determining a hash value based on the code and the selected key 1120. In particular, the server processing system 310, 325 provides input variables of the received code, the selected key 1120 from the keymap 1100 which corresponds to the index 1110 sent in step 840, and a salt value associated with the user 205, into a hashing algorithm executed by the server processing system 310, 325 to generate the hash value. Preferably, the hashing algorithm is a one-way hashing algorithm such as SHA-3, MD5 or variants thereof. It will be appreciated that the hashing algorithm can utilise commutative cipher techniques such that the personal identifier does not need to be identified by the server processing system 310, 325.

At step 870 the method 800 includes the server processing system 310, 325 storing the hash value in the user account in the database. Advantageously, the server processing system 310, 325 never stores the personal identifier of the user, nor does the server processing system 310, 325 receive data directly indicative of the personal identifier, thereby providing significant security benefits. These security benefits include, in some embodiments, an outcome where the user knows their personal identifier but no one else is able to determine the personal identifier, not even an employee of the secure environment which the user is attempting to access.

It will be appreciated that the server processing system 310, 325 may repeat steps 840 to 865 to obtain two hash values. In particular, the server processing system 310, 325 can transfer to the user device 306 (or the user 305 via the user processing system 100 if the user device 306 is not in communication with the server processing system 310, 325) another index 1110 which is different to the initial index. The server processing system 310, 325 then calculates a second hash value based on a further code received from the user 305, wherein in the event that the hash values are congruent (i.e. match), the hash value (i.e. the first or second hash value since both are the same) is stored in the database. In the event that the hash values do not match, this indicates that the user has incorrectly indicated non-congruent desired personal identifiers. The registration process thereby ends or the user is requested to repeat the registration process again.

Figure 9:
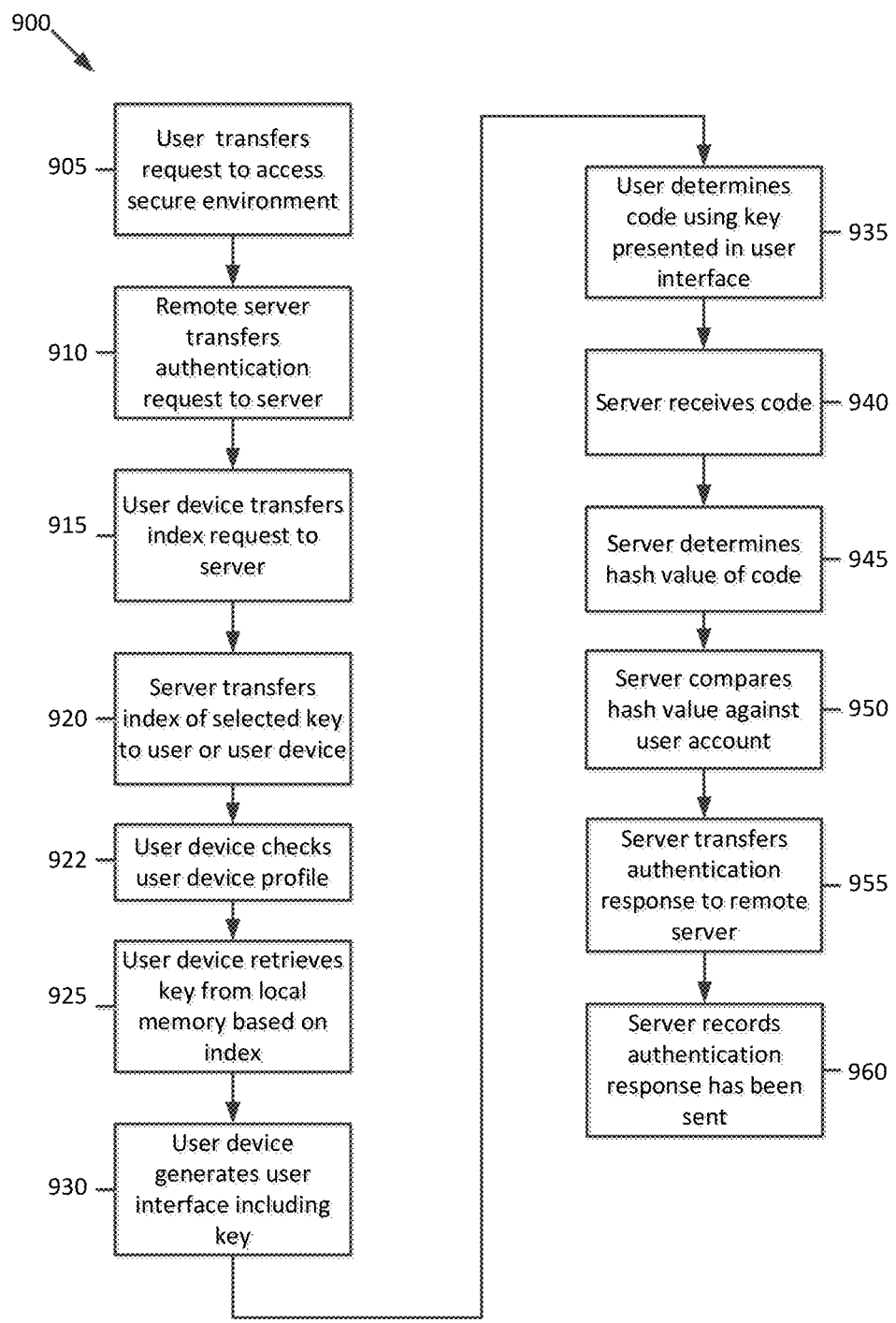
FIG. 9 illustrates a flow chart representing an example method of user registering to use an authentication service offered by the server processing system.

Referring to FIG. 9 there is shown a flow chart representing an example method of the server processing system authenticating a user attempting to access the secure environment hosted by the remote server processing system. Similar to the example described in relation to FIG. 8, in the context of the verification method and system described above, the server processing system is an IAP 310, 325, the secure environment is an online service offered or controlled by the relying party 315A, 320A, and the remote server processing system is the relying party server processing system 315, 320.

In particular, at step 905, the method 900 includes the user operating the user processing system 100 or the user device 306 to transfer a request to access the secure environment from the remote server processing system 315, 320. The request may be submitted via a web-browser, web-enabled application or the like.

At step 910, the method 900 includes the remote server processing system 315, 320 transferring an authentication request to the server processing system 310, 325 to authenticate the user 305. The authentication request is indicative of the user requesting access to the secure environment. In a preferable form, the remote server processing system 315, 320 may digitally sign the request using a digital certificate verifying the identity of the remote server processing system 315, 320 to the server processing system 310, 325. The server processing system 310, 325 may then facilitate verification of the identity of the remote server processing system 315, 320 based on the digitally signed request to ensure the request has been received from an identifiable entity. The server processing system records 310, 325 in the database that an authentication request has been received for the user and associates a timestamp with this request.

In response to the request to access the secure environment from the remote server processing system 310, 325, the remote server processing system 310, 325 transfers to the requesting device an interface including the code request interface hosted by the server processing system 310, 325. The code request interface may be presented via a web-browser, web-enabled application or the like.

As step 915, the method 900 includes the user 305 interacting with the software application of user device 306 to transfer an index request to the server processing system 310, 325, such that the server processing system 310, 325 selects of an index 1110 of a key 1120 from the user's keymap 1100 for authenticating the user 305. In a preferable form, the server processing system 310, 325 is required to receive the index request 310, 325 from the user within a temporal threshold period, otherwise the server processing system 310, 325 will send an authentication response to the remote server processing system 315, 320 indicating that the user 305 is not authenticated to access the secure environment. To send the request, the user 305 may launch the software application on the user device 306 to initiate the transfer of the index request. At this time, the user device 306 may also digitally sign the index request by using a private key of the user's digital certificate to enable the server processing system 310, 325 to verify the user's identity using the corresponding public key. In the event that the digital signature does not successfully verify the identity of the user, the server processing system 310, 325 can transfer an authentication response to the remote server processing system 315, 320 indicating that the user 305 is not authenticated to access the secure environment.

At step 920, the method 900 includes the remote server processing system 315, 320 transferring, to the software application of the user device 306 associated with the user 305, data indicative of the index 1110 of the selected key 1120 from the keymap 1100 associated with the user's account. The server processing system 310, 325 records in the user account a challenge being issued indicative of the selected index 1110. As discussed previously, in the event that the user device 306 is not in data communication with the server processing system 310, 325, the server processing system 310, 325 can transfer data indicative of the index of the selected index 1110 to the user processing system 100 for presentation to the user. The user 305 can then manually input into the software application the presented index via an input device of the user device 306 such that the user device 306 has successfully received the index. The user may be required to interact with the user processing system 100 to request transfer of the index 1110 to the user processing system 100.

Optionally at step 922, the method includes the user device 306 performing a security check. In particular, the software application determines the one or more user device characteristics to generate the user device profile as previously discussed earlier in this document. The software application then compares the newly generated user device profile against the user device profile stored in memory of the user device 306. In the event of a successful comparison, the method proceeds to step 825, otherwise the method ends. This process can identify if tampering has occurred to the user device 306.

At step 925, the method 900 includes the software application of the user device 306 retrieving from local memory the key 1120 corresponding to the index 1110 from the keymap 1100.

At step 930, the method 900 includes the software application of the user device 306 generating and displaying a user interface 1100 on the user device 306, wherein the user interface 1100 presents a graphical representation of the key 1120 and the identifier reference 1150. This process is performed similarly to step 850 discussed above.

At step 935, the method 900 includes the user 305 using the user interface 1140 of the software application presented by user device 306 to determine the code. The step is performed similarly to step 855 discussed above except the user inputs, via the code request interface, key portions that correspond to the portions of the set personal identifier rather than the desired personal identifier.

At step 940, the method 900 includes the user processing 340 or the user device transferring, via the code request interface and to the server processing system 310, 325, data indicative of the code input by the user.

The server processing system 310, 325 may be configured to determine if the challenge response has been received within a temporal threshold period of the initial authentication request being received and/or the challenge request being issued. In the event that the response has not been received within the temporal threshold period, the server processing system 310, 325 may transfer an authentication response to the remote server processing system indicating that the user is not authenticated for accessing the secure environment.

At step 945, the method 900 includes the server processing system 310, 325 determining a hash value based on the code and the selected key 1120. In particular, the server processing system 310, 325 provides input variables of the received code, the selected key corresponding to the index 1110 received by the user device 306, and a salt value associated with the user 305, into a hashing algorithm executed by the server processing system 310, 325 to generate the hash value. Preferably, the hashing algorithm is a one-way hashing algorithm such as SHA-3, MD5 or variants thereof. It will be appreciated that the hashing algorithm can utilise commutative cipher techniques such that the personal identifier does not need to be identified by the server processing system 310, 325.

At step 950, the method 900 includes the server processing system 310, 325 comparing the determined hash value against the stored hash value in the user account. Advantageously, the server processing system 310, 325 never obtains or receives the personal identifier of the user thereby providing significant security benefits. These security benefits include, in some embodiments, an outcome where the user knows their personal identifier but no one else is able to determine the personal identifier, not even an employee of the secure environment which the user is attempting to access.

At step 955, the method 900 includes the server processing system 310, 325 generating and transferring an authentication response to the remote server processing system 315, 320, wherein the authentication response is indicative of whether the user is authenticated to access to the secure environment based upon the comparison in step 950. In particular, in the event that the hash values do not correspond in the comparison performed in step 950, the server processing system 310, 325 generates and transfers an authentication response indicating that the user should not be granted access to the secure environment controlled by the remote server processing system 315, 320. However, in the event that the hash values do correspond in the comparison performed in step 960, the server processing system 310, 325 generates and transfers an authentication response indicating that the user should be granted access to the secure environment controlled by the remote server processing system 315, 320.

At step 960, the method 900 includes the server processing system 310, 325 recording in the user account that the challenge response has been received and the authentication response has been transferred to the remote server processing system 315, 320.

It will be appreciated that if the user incorrectly enters the code via the user processing system 100, the server processing system 310, 325 may re-issue one or more further challenge requests, wherein a unique and different index 1110 is transferred in each challenge request. Upon a threshold number of incorrect codes being identified by the server processing system 310, 325 for the single authentication request by the remote server processing system 315, 320, the server processing system 310, 325 can generate and transfer an authentication response to the remote server processing system 315, 320 indicating that the user should not be granted access to the secure environment.

Figure 10:
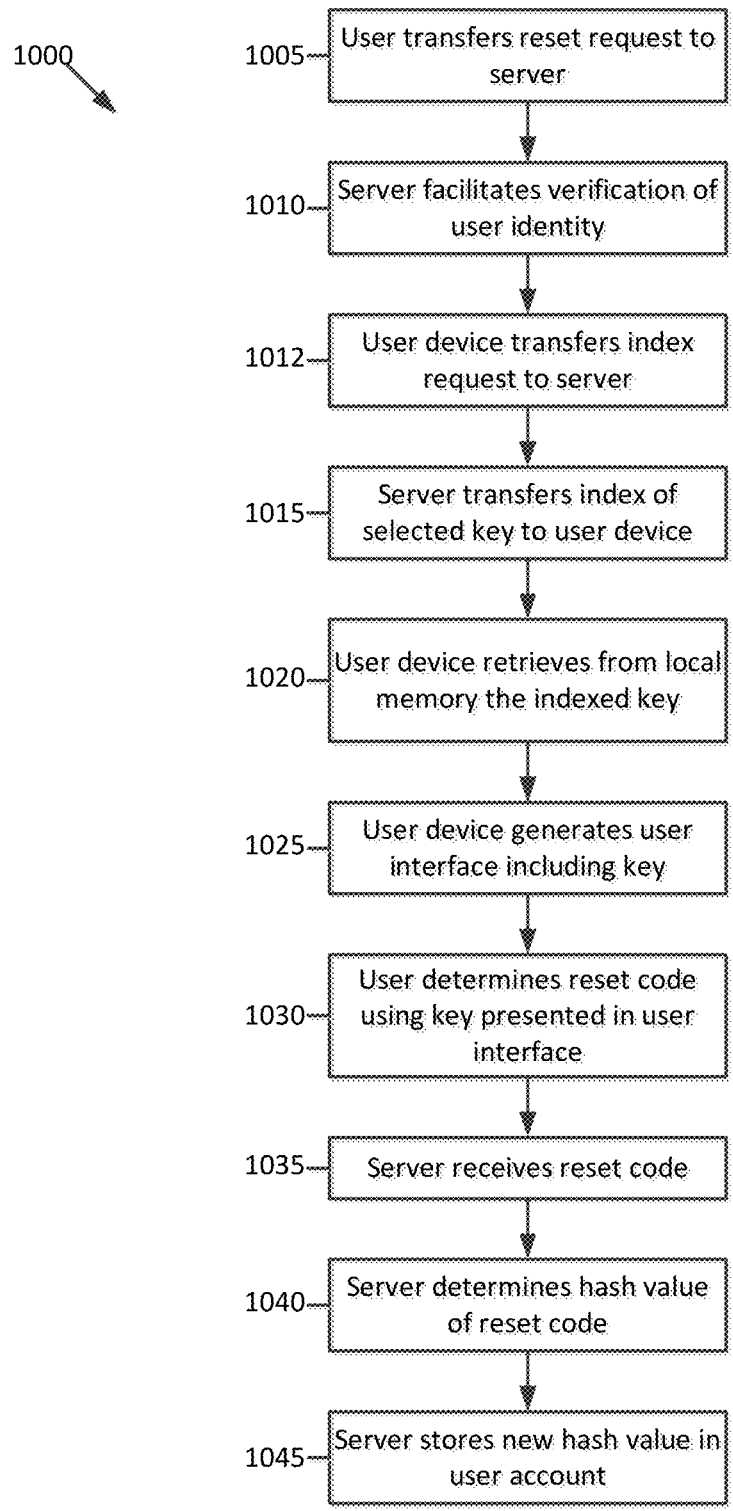
FIG. 10 illustrates a flow chart representing an example method of a user resetting a personal identifier for use in authenticating the user.

Referring to FIG. 10 there is shown a flow chart representing a method of a user transferring a reset request to the server processing system. Similar to the examples described in relation to FIGS. 8 and 9, in the context of the verification method and system described above, the server processing system is an IAP 310, 325, the secure environment is an online service offered or controlled by the relying party 315A, 320A, and the remote server processing system is the relying party server processing system 315, 320.

In particular, at step 1005, the method 1000 includes the user transferring a reset request to the server processing system 310, 325 to reset the user's personal identifier. The reset request can be sent from the user processing system 100 or the user device 306 potentially via the software application. The reset request can include data which can be used by the server processing system 310, 325, or the identity verification processing system, to verify the identity of the user.

At step 1010, the server processing system 310, 325 facilitates verification of the user's identity. In response to successful verification of the user's identity, a code request interface, hosted by the server processing system 310, 325, is presented to the user 305 via the user device 306 or the user processing system 100 and the method proceeds to step 1012, otherwise the resetting process ends.

At step 1012, the user interacts with the software application of the user device 306 to transfer an index request to the server processing system 310, 325.

At step 1015, the method 1000 includes the server processing system 310, 325 transferring, to the user device 306, an index 1110 of a selected key 1120 from the keymap 1100 associated with the user account. As discussed previously, in the event that the user device 306 is not in data communication with the server processing system 310, 325, the server processing system 310, 325 can transfer data indicative of the index 1110 of the selected key 1120 to the user processing system 100 for presentation to the user 305. The user 305 can then manually input the presented index 1110 via an input device of the user device 306 into the software application such that the user device 306 has successfully received the index 1110. The user 305 may be required to interact with the user processing system 100 to request transfer of the index to the user processing system 100.

The server processing system 310, 325 can store in the database a record of the reset request being received and the index 1110 being transferred to the user 305, wherein a timestamp is recorded in the database indicative of the time which each of these events occurred.

At step 1020, the method 1000 includes the software application of the user device 306 retrieving from local memory the key 1120 corresponding with the received index 1110 from the keymap 1100 stored in the memory of the user device 306.

At step 1025, the method 1000 includes the user device 306 generating and displaying a user interface 1100 on the user device 306, wherein the user interface 1100 presents a graphical representation of the key 1120 and the identifier reference 1150. This step is performed similarly to step 850 discussed above.

At step 1030, the method 1000 includes the user using the user interface presented by the user device 306 to determine the reset code. For example, for each digit of the new personal identifier, the user 350 identifies each key portion 1130 which corresponds to the respective digit in the identifier reference 1150 and concatenates the corresponding key portions 1130 together to form the reset code. Based on the interface presented in FIG. 11B, if the user's new personal identifier is "5732", the reset code input by the user is "XKSL".

At step 1035, the method 1000 includes the user processing system 100 or the user device 306 transferring, to the server processing system 310, 325 via the code request interface, a response indicative of the reset code input by the user.

The server processing system 310, 325 may be configured to determine if the reset code has been received within a temporal threshold period of the reset request or the transfer of the index. In the event that the reset code has not been received within the temporal threshold period, the server processing system 310, 325 may refuse to reset the personal identifier based on the received reset code.

At step 1040, the method 1000 includes the server processing system 310, 325 determining a hash value based on the reset code and the selected key. In particular, the server processing system 310, 325 provides input variables of the received reset code, the key from the keymap corresponding to the index transferred to the user, and a salt value associated with the user, into a hashing algorithm executed by the server processing system 310, 325 to generate the hash value. Preferably, the hashing algorithm is a one-way hashing algorithm such as SHA-3, MD5, or variants thereof.

At step 1045, the method 1000 includes the server processing system 310, 325 storing the determined hash value of the user's new personal identifier in the user account and deleting the previous hash value corresponding to the user's previous personal identifier. Advantageously, the server processing system 310, 325 never stores the new personal identifier of the user, nor does the server processing system 310, 325 receive data directly indicative of the new personal identifier, thereby providing significant security benefits. These security benefits include, in some embodiments, an outcome where the user knows their personal identifier but no one else is able to determine the personal identifier, not even an employee of the secure environment which the user is attempting to access.

It will be appreciated that steps 1010 to 1040 may be repeated in order to confirm the user has indirectly identified the same new personal identifier. In the event that the two hash values correspond, the hash value corresponding to the new personal identifier is stored in the user account.

It will be appreciated that although parts of the above process have been described in relation to the user interacting with a user processing system 100, it is possible that the user may use the user device 306 to perform the same steps.

It will be appreciated that the authentication method describes a single user 305 and a single remote server processing system 310, 325. It will be appreciated that the server processing system 310, 325 is preferably in data communication with a plurality of remote server processing systems 315, 320, wherein each remote server processing system 315, 320 controls user access to a respective secure environment or secure service.

It will also be appreciated that the server processing system 310, 325 is preferably in data communication with a plurality of user devices 360 associated with a respective plurality of users 305, wherein the memory associated with the server processing system 310, 325 stores a plurality of user accounts in order to authenticate the plurality of users.

It will be appreciated that the server processing system 310, 325 may be provided in the form of a distributed processing system or a single dedicated processing system.

It will be appreciated that data transferred between various components of the system may utilise encryption and digital signature techniques.

It will be appreciated that other hashing processes can be applied by the server processing system 310, 325. In particular, the server processing system 310, 325 may alternatively determine the user's personal identifier by reversely applying the selected key associated with the index sent in the request to the user device. Upon determination, the server processing system 310, 325 may immediately hash the user's personal identifier. The user's personal identifier can then be immediately purged from RAM of the server processing system 310, 325 so that no data is stored by the server processing system 310, 325 which is directly indicative of the user's personal identifier.

It will be appreciated that the identity verification processing system may be part of the server processing system 310, 325 or a separate processing system in data communication with the server processing system 310, 325.

Whilst the keys and personal identifiers have been exemplified above as a series alphabetic characters and/or numerical digits, it is possible that other forms of data could be used, such as unique graphical icons, shapes, colours, audible sounds, and the like.

The application may be configured to offer additional or alternate authentication processes which the IAP server processing system 310, 325 is configured to use to authenticate the user. In particular, the application can record a biometric sample such as a voice sample. The voice sample can be stored by the IAP server processing system 310, 325 and compared against a further voice sample provided by the user 305 via the application executed by the device 306 to determine if the user is authenticated.

The above embodiments can preferably use PKI infrastructure, although it will be appreciated that other digital certificate techniques could also be utilised.

Example Processing System

A particular embodiment can be realised using a processing system, an example of which is shown in FIG. 1. In particular, the processing system 100 generally includes at least one processor 102, or processing unit or plurality of processors, memory 104, at least one input device 106 and at least one output device 108, coupled together via a bus or group of buses 110. In certain embodiments, input device 106 and output device 108 could be the same device. An interface 112 also can be provided for coupling the processing system 100 to one or more peripheral devices, for example interface 112 could be a PCI card or PC card. At least one storage device 114 which houses at least one database 116 can also be provided. The memory 104 can be any form of memory device, for example, volatile or non-volatile memory, solid state storage devices, magnetic devices, etc. The processor 102 could include more than one distinct processing device, for example to handle different functions within the processing system 100.

Input device 106 receives input data 118 and can include, for example, a keyboard, a pointer device such as a pen-like device or a mouse, audio receiving device for voice controlled activation such as a microphone, data receiver or antenna such as a modem or wireless data adaptor, data acquisition card, etc. Input data 118 could come from different sources, for example keyboard instructions in conjunction with data received via a network. Output device 108 produces or generates output data 120 and can include, for example, a display device or monitor in which case output data 120 is visual, a printer in which case output data 120 is printed, a port for example a USB port, a peripheral component adaptor, a data transmitter or antenna such as a modem or wireless network adaptor, etc. Output data 120 could be distinct and derived from different output devices, for example a visual display on a monitor in conjunction with data transmitted to a network. A user could view data output, or an interpretation of the data output, on, for example, a monitor or using a printer. The storage device 114 can be any form of data or information storage means, for example, volatile or non-volatile memory, solid state storage devices, magnetic devices, etc.

In use, the processing system 100 is adapted to allow data or information to be stored in and/or retrieved from, via wired or wireless communication means, the at least one database 116 and/or the memory 104. The interface 112 may allow wired and/or wireless communication between the processing unit 102 and peripheral components that may serve a specialised purpose. The processor 102 receives instructions as input data 118 via input device 106 and can display processed results or other output to a user by utilising output device 108. More than one input device 106 and/or output device 108 can be provided. It should be appreciated that the processing system 100 may be any form of terminal, server, specialised hardware, or the like.

The processing device 100 may be a part of a networked communications system 200, as shown in FIG. 2. Processing device 100 could connect to network 202, for example the Internet or a WAN. Input data 118 and output data 120 could be communicated to other devices via network 202. Other terminals, for example, thin client 204, further processing systems 206 and 208, notebook computer 210, mainframe computer 212, PDA 214, pen-based computer 216, server 218, etc., can be connected to network 202. A large variety of other types of terminals or configurations could be utilised. The transfer of information and/or data over network 202 can be achieved using wired communications means 220 or wireless communications means 222. Server 218 can facilitate the transfer of data between network 202 and one or more databases 224. Server 218 and one or more databases 224 provide an example of an information source.

Other networks may communicate with network 202. For example, telecommunications network 230 could facilitate the transfer of data between network 202 and mobile or cellular telephone 232 or a PDA-type device 234, by utilising wireless communication means 236 and receiving/transmitting station 238. Satellite communications network 240 could communicate with satellite signal receiver 242 which receives data signals from satellite 244 which in turn is in remote communication with satellite signal transmitter 246. Terminals, for example further processing system 248, notebook computer 250 or satellite telephone 252, can thereby communicate with network 202. A local network 260, which for example may be a private network, LAN, etc., may also be connected to network 202. For example, network 202 could be connected with ethernet 262 which connects terminals 264, server 266 which controls the transfer of data to and/or from database 268, and printer 270. Various other types of networks could be utilised.

The processing device 100 is adapted to communicate with other terminals, for example further processing systems 206, 208, by sending and receiving data, 118, 120, to and from the network 202, thereby facilitating possible communication with other components of the networked communications system 200.

Thus, for example, the networks 202, 230, 240 may form part of, or be connected to, the Internet, in which case, the terminals 206, 212, 218, for example, may be web servers, Internet terminals or the like. The networks 202, 230, 240, 260 may be or form part of other communication networks, such as LAN, WAN, ethernet, token ring, FDDI ring, star, etc., networks, or mobile telephone networks, such as GSM, CDMA or 3G, etc., networks, and may be wholly or partially wired, including for example optical fibre, or wireless networks, depending on a particular implementation.

Conclusion

The above embodiments may take the form of an entirely hardware embodiment, an entirely software embodiment, firmware, or an embodiment combining software and hardware aspects.

Many modifications will be apparent to those skilled in the art without departing from the scope of the present invention.

The invention claimed is:

1. A method performed by a server processing system including steps of:
    receiving digitally signed data including rating data issued by a second server processing system in order for an entity to register for a service associated with the server processing system, the rating data is indicative of an identity verification rating for the entity and an authentication technology rating indicative of one or more classes defining authentication technology which the entity is able to utilize for authentication;
    verifying that the digitally signed data has been issued by the second server processing system;
    in response to the rating data being successfully verified:
        determining that the authentication technology rating is sufficient to access the service associated with the server processing system;
        in response to the authentication technology rating being sufficient to access the service associated with the server processing system, using the identity verification rating to register the entity; and after the entity being registered:
        receiving a request to authenticate the user to access the service after registration; and
        authenticating the user using an authentication technology which is part of the one or more classes of authentication technology indicated by the authentication technology rating.

2. The method according to claim 1, wherein the method includes receiving the digitally signed data from a relying party processing system offering the service upon successful identity verification.

3. The method according to claim 2, wherein the method includes the server processing system receiving, from the relying party, a request to authenticate the user to access the server after registration, wherein the server processing system transfers a response to the relying party indicative of the authentication result.

4. The method according to claim 3, wherein the method includes:
    receiving, from a relying party processing system associated with the relying party, the request to authenticate the user;
    transferring, to the entity or an entity device associated with the entity, an index corresponding to a selected key from a plurality of keys, wherein the plurality of keys are stored in memory of the entity device;
    receiving data indicative of a code, wherein the user determines the code based on the selected key presented by the entity device and a personal identifier;
    determining a hash value of the code;
    comparing the determined hash value against a stored hash value associated with a user account stored in the server accessible memory; and
    transferring the response to the relying party processing system, wherein the response is indicative of whether the user is authenticated for accessing the service based on the comparison.

5. The method according to claim 1, wherein the method includes the server processing system comparing the identity verification rating against a threshold identity verification rating, wherein in the event that the identity verification rating satisfies the threshold identity verification rating, the user is successfully registered.

6. The method according to claim 1, wherein the digitally signed data includes an identifier of the second server processing system, wherein the method includes the server processing system requesting a copy of a digital certificate from a certificate authority using the identifier of the second server processing system in order to verify the digitally signed data.

7. The method according to claim 1, wherein the digitally signed data includes one or more conditions, wherein the method includes the server processing system determining whether the one or more conditions are satisfied in order to register the entity.

8. A server processing system configured to:
    receive digitally signed rating data issued by a second server processing system in order for an entity to register for a service associated with the server processing system, the rating data being indicative of an identity verification rating for the entity and an authentication technology rating indicative of one or more classes defining authentication technology which the entity is able to utilize for authentication;
    verify that the rating data has been issued by the second server processing system based on a digital signature associated with the rating data;
    in response to the rating data being successfully verified as being issued by the second server processing system:
        determine that the authentication technology rating is sufficient to access the service associated with the server processing system;
        in response to the authentication technology rating being sufficient to access the service associated with the server processing system, use the identity verification rating to register the entity;
    after the entity being registered:
        receive a request to authenticate the user to access the service after registration; and
        authenticate the user using an authentication technology in accordance with the authentication technology rating.

9. The server processing system according to claim 8, wherein the server processing system is configured to receive the digitally signed data from a relying party processing system offering the service upon successful identity verification.

10. The server processing system according to claim 9, wherein the server processing system is configured to receive from the relying party, a request to authenticate the user to access the service after registration, wherein the server processing system transfers a response to the relying party indicative of the authentication result.

11. The server processing system according to claim 10, wherein the server processing system is configured to:
receive, from a relying party processing system associated with the relying party, the request to authenticate the user;
transfer, to the entity or an entity device associated with the entity, an index corresponding to a selected key from a plurality of keys, wherein the plurality of keys are stored in memory of the entity device;
receive data indicative of a code, wherein the user determines the code based on the selected key presented by the entity device and a personal identifier;
determine, a hash value of the code;
compare the determined hash value against a stored hash value associated with a user account stored in the server accessible memory; and
transfer the response to the relying party processing system, wherein the response is indicative of whether the user is authenticated for accessing the service based on the comparison.

12. The server processing system according to claim 8, wherein the server processing system is configured to compare the identity verification rating against a threshold identity verification rating, wherein in the event that the identity verification rating satisfies the threshold identity verification rating, the user is successfully registered.

13. The server processing system according to claim 8, wherein the digitally signed data includes an identifier of the second server processing system, wherein the server processing system is configured to request a copy of a digital certificate from a certificate authority using the identifier of the second server processing system in order to verify the digitally signed data.

14. The server processing system according to claim 8, wherein the digitally signed data includes one or more conditions, wherein the server processing system is configured to determine whether the one or more conditions are satisfied in order to register the entity.

15. A non-transitory computer readable medium including executable instructions, wherein the executable instructions configure the server processing system to:
receive digitally signed rating data issued by a second server processing system in order for an entity to register for a service associated with the server processing system, the rating data being indicative of an identity verification rating for the entity and an authentication technology rating indicative of one or more classes defining authentication technology which the entity is able to utilize for authentication;
verify that the rating data has been issued by the second server processing system based on a digital signature associated with the rating data;
in response to the rating data being successfully verified:
determine that the authentication technology rating is sufficient to access the service associated with the server processing system;
in response to the authentication technology rating being sufficient to access the service associated with the server processing system, use the identity verification rating to register the entity;
after the entity being registered:
receive, from the relying party, a request to authenticate the user to access the service after registration; and
authenticate the user using an authentication technology in accordance with the authentication technology rating.

16. The computer readable medium according to claim 15, wherein the executable instructions configure the server processing system to receive the digitally signed data from a relying party processing system offering the service upon successful identity verification.

17. The computer readable medium according to claim 16, wherein the server processing system is configured by the executable instructions to receive from the relying party, a request to authenticate the user to access the service after registration, wherein the server processing system transfers a response to the relying party indicative of the authentication result.

18. The computer readable medium to claim 17, wherein the server processing system is configured by the executable instructions configure to:
receive, from a relying party processing system associated with the relying party, the request to authenticate the user;
transfer, to the entity or an entity device associated with the entity, an index corresponding to a selected key from a plurality of keys, wherein the plurality of keys are stored in memory of the entity device and in server accessible memory;
receive data indicative of a code, wherein the user determines the code based on the selected key presented by the entity device and a personal identifier;
determine, a hash value of the code;
compare the determined hash value against a stored hash value associated with a user account stored in the server accessible memory; and
transfer the response to the relying party processing system, wherein the response is indicative of whether the user is authenticated for accessing the service based on the comparison.

19. The computer readable medium according to claim 15, wherein the executable instructions configure the server processing system to compare the identity verification rating against a threshold identity verification rating, wherein in the event that the identity verification rating satisfies the threshold identity verification rating, the user is successfully registered.

20. The computer readable medium according to claim 15, wherein the digitally signed data includes an identifier of the second server processing system, wherein the executable instructions configure the server processing system to request a copy of a digital certificate from a certificate authority using the identifier of the second server processing system in order to verify the digitally signed data.

21. The computer readable medium according to claim 15, wherein the digitally signed data includes one or more conditions, wherein the executable instructions configure the server processing system to determine whether the one or more conditions are satisfied in order to register the entity.

* * * * *